US012414126B2

(12) United States Patent
Takeda et al.

(10) Patent No.: US 12,414,126 B2
(45) Date of Patent: Sep. 9, 2025

(54) SCHEDULED CELL IDENTIFICATION FOR MULTI-CELL SCHEDULING

(71) Applicant: QUALCOMM Incorporated, San Diego, CA (US)

(72) Inventors: Kazuki Takeda, Tokyo (JP); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 17/883,560

(22) Filed: Aug. 8, 2022

(65) Prior Publication Data

US 2024/0049244 A1 Feb. 8, 2024

(51) Int. Cl.
*H04W 72/23* (2023.01)

(52) U.S. Cl.
CPC .................. *H04W 72/23* (2023.01)

(58) Field of Classification Search
CPC ..... H04W 72/23; H04W 16/14; H04W 88/10; H04W 88/06
See application file for complete search history.

(56) References Cited

U.S. PATENT DOCUMENTS

| | | | |
|---|---|---|---|
| 2020/0067675 A1* | 2/2020 | Takeda | H04L 5/0053 |
| 2021/0391955 A1* | 12/2021 | He | H04L 5/0053 |
| 2022/0086867 A1 | 3/2022 | Papasakellariou | |
| 2022/0103288 A1* | 3/2022 | Matsumura | H04L 5/0035 |
| 2022/0329366 A1* | 10/2022 | Kim | H04L 1/1887 |
| 2023/0144002 A1 | 5/2023 | Kim et al. | |
| 2023/0156700 A1* | 5/2023 | Liu | H04W 24/08 |
| | | | 370/329 |
| 2023/0354332 A1* | 11/2023 | Cirik | H04W 72/23 |
| 2024/0040429 A1* | 2/2024 | MolavianJazi | H04W 28/06 |
| 2024/0080929 A1* | 3/2024 | Matsumura | H04W 76/20 |

(Continued)

FOREIGN PATENT DOCUMENTS

WO WO-2021206422 A1 10/2021

OTHER PUBLICATIONS

International Search Report and Written Opinion—PCT/US2023/069088—ISA/EPO—Oct. 16, 2023.

(Continued)

*Primary Examiner* — Andrew Lee
(74) *Attorney, Agent, or Firm* — Paul M. McAdams; Holland & Hart LLP

(57) ABSTRACT

Methods, systems, and devices for wireless communications are described. A user equipment (UE) may receive a multi-cell downlink control information (MC-DCI) that via a scheduling cell may schedule communications for more than one scheduled cells. The overhead of a DCI (e.g., an MC-DCI) may be reduced by compressing or removing the carrier indication field (CIF). For example, radio resource control signaling may indicate, to a UE, a DCI payload size, control channel elements (CCE)s, and/or physical downlink control channel (PDCCH) candidates per scheduled cell or per group of scheduled cells. If the DCI payload sizes, CCEs, and/or PDCCH candidates are different for the scheduled cells indicated in the radio resource control message, the UE may determine to which scheduled cell(s) a DCI received in a PDCCH monitoring occasion applies based on the payload size and/or CCEs of the PDCCH monitoring occasion without using a CIF.

30 Claims, 16 Drawing Sheets

(56) References Cited

U.S. PATENT DOCUMENTS

2024/0267931 A1\* 8/2024 Zhou ................... H04L 5/0092
2025/0016794 A1\* 1/2025 Park .................... H04W 72/12
2025/0024458 A1\* 1/2025 Liu ..................... H04L 5/0053

OTHER PUBLICATIONS

Samsung: "Multi-Cell PUSCH/POSCH Scheduling with a Single DCI", 3GPP TSG RAN WG1 #109-e, R1-2203925, 3rd Generation Partnership Project (3GPP), Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 9 Pages, XP052143996, Section 1, p. 1, Section 5, p. 5-p. 6.

\* cited by examiner

SCHEDULED CELL IDENTIFICATION FOR MULTI-CELL SCHEDULING

The following relates to wireless communications relating to scheduled cell identification for multi-cell scheduling. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support scheduled cell identification for multi-cell scheduling. For example, the described techniques provide for multi-cell downlink control information (MC-DCI) with reduced overhead. A user equipment (UE) may receive an MC-DCI via a scheduling cell that may schedule communications for more than one scheduled cell. As an MC-DCI conveys more information than a single-cell DCI in order to schedule communications on multiple cells, the overhead of a MC-DCI may be increased as compared to a single-cell DCI. The overhead of a DCI may be reduced by compressing or removing the carrier indication field (CIF). For example, radio resource control (RRC) signaling may indicate, to a UE, a DCI payload size, control channel elements (CCE)s, and/or physical downlink control channel (PDCCH) candidates per scheduled cell or per group of scheduled cells. If the DCI payload sizes, CCEs, and/or PDCCH candidates are different for the scheduled cells indicated in the RRC message, the UE may determine to which scheduled cell(s) a DCI received in a PDCCH monitoring occasion applies based on the payload size and/or CCEs of the PDCCH monitoring occasion without using a CIF field. In some aspects, if the DCI payload sizes, CCEs, and PDCCH candidates for two or more scheduled cells or groups of scheduled cells are the same, the UE may determine the scheduled cell(s) for a PDCCH monitoring occasion without a CIF based on one or more configured rules. In some aspects, if the DCI payload sizes, CCEs, and PDCCH candidates for two or more scheduled cells or groups of scheduled cells are the same, the UE may determine the corresponding scheduled cell or group of scheduled cells for a PDCCH monitoring occasion without a CIF based on determining the radio network temporary identifier (RNTI) that was used to scramble the cyclic redundancy check (CRC) for the PDCCH monitoring occasion and matching the RNTI to a scheduled cell or group of scheduled cells.

A method for wireless communications at a first network node is described. The method may include receiving control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells, determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells, and receiving, via the downlink control channel monitoring occasion, DCI in accordance with the determined DCI format.

A first network node for wireless communications is described. The first network node may a memory and at least one processor coupled to the memory. The at least one processor may be configured to receive control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells, determine, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells, and receive, via the downlink control channel monitoring occasion, DCI in accordance with the determined DCI format.

Another apparatus for wireless communications at a first network node is described. The apparatus may include means for receiving control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells, means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells, and means for receiving, via the downlink control channel monitoring occasion, DCI in accordance with the determined DCI format.

A non-transitory computer-readable medium having code for wireless stored thereon is described. The code when executed by a first network node, causes the network node to receive control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells, determine, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells, and receive, via the downlink control channel monitoring occasion, DCI in accordance with the determined DCI format.

In some examples of the method, apparatuses, and non-transitory computer-readable medium described herein, determining the DCI format may include operations, features, means, or instructions for determining the DCI format based on the third comparison information.

In some examples of the method, apparatuses, and non-transitory computer-readable medium described herein, determining the DCI format may include operations, features, means, or instructions for determining the DCI format based on a payload size for the downlink control channel monitoring occasion that matches a respective DCI payload size of the subset scheduled cells.

In some examples of the method, apparatuses, and non-transitory computer-readable medium described herein, determining the DCI format may include operations, features, means, or instructions for determining the DCI format based on a set of CCEs for the downlink control channel monitoring occasion that matches a respective set of CCEs for the subset of scheduled cells.

Some examples of the method, apparatuses, and non-transitory computer-readable medium described herein may further include operations, features, means, or instructions for determining, based on the first comparison information being indicative that at least two respective DCI payload sizes for at least two subsets of scheduled cells may be equal and further based on the second comparison information being indicative that respective sets of CCEs for the at least two subsets of scheduled cells may be equal, that the DCI includes the presence of the indication of the subset of scheduled cells, where the indication of the subset of scheduled cells includes an explicit indication of the subset of scheduled cells.

Some examples of the method, apparatuses, and non-transitory computer-readable medium described herein may further include operations, features, means, or instructions for determining, based on the first comparison information being indicative that at least two respective DCI payload sizes for at least two subsets of scheduled cells may be equal and further based on the second comparison information being indicative that respective sets of CCEs for the at least two subsets of scheduled cells may be equal, that the DCI includes the presence of the indication of the subset of scheduled cells, where the indication of the subset of scheduled cells includes a rule-based indication of the subset of scheduled cells.

In some examples of the method, apparatuses, and non-transitory computer-readable medium described herein, the rule-based indication includes information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

Some examples of the method, apparatuses, and non-transitory computer-readable medium described herein may further include operations, features, means, or instructions for determining, based on the first comparison information being indicative that at least two respective DCI payload sizes for at least two subsets of scheduled cells may be equal and further based on the second comparison information being indicative that respective sets of CCEs for the at least two subsets of scheduled cells may be equal, that the DCI includes the presence of the indication of the subset of scheduled cells, where the indication of the subset of scheduled cells includes a radio network identifier used to scramble a cyclic redundancy check of the downlink control channel monitoring occasion.

In some examples of the method, apparatuses, and non-transitory computer-readable medium described herein, the control signaling further includes an indication of an association between respective radio network identifiers and each subset of scheduled cells.

In some examples of the method, apparatuses, and non-transitory computer-readable medium described herein, DCI includes scheduling information for one or more communications with the subset of scheduled cells.

In some examples of the method, apparatuses, and non-transitory computer-readable medium described herein, the control signaling further includes an indication of a respective carrier indicator associated with each scheduled cell of the set of scheduled cells and a determination of the scheduling information may be based on the indication of the respective carrier indicator associated with each scheduled cell of the set of scheduled cells.

Some examples of the method, apparatuses, and non-transitory computer-readable medium described herein may further include operations, features, means, or instructions for comparing the respective DCI payload sizes and generating the first comparison information based on the comparison of the respective DCI payload sizes.

Some examples of the method, apparatuses, and non-transitory computer-readable medium described herein may further include operations, features, means, or instructions for comparing the respective sets of CCEs and generating the second comparison information based on the comparison of the respective sets of CCEs.

A method for wireless communications at a first network node is described. The method may include transmitting, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells, determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the downlink control channel format includes an absence or a presence of an indication of the subset of scheduled cells, and transmitting, via the downlink control channel monitoring occasion, a DCI in accordance with the determined DCI format.

A first network node for wireless communications is described. The first network node may a memory and at least one processor coupled to the memory. The at least one processor may be configured to cause the apparatus to transmit, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells, determine, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the downlink control channel format includes an absence or a presence of an indication of the subset of scheduled cells, and transmit, via the downlink control channel monitoring occasion, a DCI in accordance with the determined DCI format.

Another apparatus for wireless communications at a first network node is described. The apparatus may include means for transmitting, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells, means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the downlink control channel format includes an absence or a presence of an indication of the subset of scheduled cells, and means for transmitting, via the downlink control channel monitoring occasion, a DCI in accordance with the determined DCI format.

A non-transitory computer-readable medium having code for wireless stored thereon is described. The code when executed by a first network node, causes the network node to transmit, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells, determine, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the downlink control channel format includes an absence or a presence of an indication of the subset of scheduled cells, and transmit, via the downlink control channel monitoring occasion, a DCI in accordance with the determined DCI format.

In some examples of the method, apparatuses, and non-transitory computer-readable medium described herein, determining the DCI format may include operations, features, means, or instructions for determining the DCI format based on the third comparison information.

In some examples of the method, apparatuses, and non-transitory computer-readable medium described herein, determining the DCI format may include operations, features, means, or instructions for determining the DCI format based on a payload size for the downlink control channel monitoring occasion that matches a respective DCI payload size of the subset scheduled cells.

In some examples of the method, apparatuses, and non-transitory computer-readable medium described herein, determining the DCI format may include operations, features, means, or instructions for determining the DCI format based on a set of CCEs for the downlink control channel monitoring occasion that matches a respective set of CCEs for the subset of scheduled cells.

Some examples of the method, apparatuses, and non-transitory computer-readable medium described herein may further include operations, features, means, or instructions for determining, based on the first comparison information being indicative that at least two respective DCI payload sizes for at least two subsets of scheduled cells may be equal and further based on the second comparison information being indicative that respective sets of CCEs for the at least two subsets of scheduled cells may be equal, that the DCI includes the presence of the indication of the subset of scheduled cells, where the indication of the subset of scheduled cells includes an explicit indication of the subset of scheduled cells.

Some examples of the method, apparatuses, and non-transitory computer-readable medium described herein may further include operations, features, means, or instructions for determining, based on the first comparison information being indicative that at least two respective DCI payload sizes for at least two subsets of scheduled cells may be equal and further based on the second comparison information being indicative that respective sets of CCEs for the at least two subsets of scheduled cells may be equal, that the DCI includes the presence of the indication of the subset of scheduled cells, where the indication of the subset of scheduled cells includes a rule-based indication of the subset of scheduled cells.

In some examples of the method, apparatuses, and non-transitory computer-readable medium described herein, the rule-based indication includes information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

Some examples of the method, apparatuses, and non-transitory computer-readable medium described herein may further include operations, features, means, or instructions for determining, based on the first comparison information being indicative that at least two respective DCI payload sizes for at least two subsets of scheduled cells may be equal and further based on the second comparison information being indicative that respective sets of CCEs for the at least two subsets of scheduled cells may be equal, that the DCI includes the presence of the indication of the subset of scheduled cells, where the indication of the subset of scheduled cells includes a radio network identifier used to scramble a cyclic redundancy check of the downlink control channel monitoring occasion.

In some examples of the method, apparatuses, and non-transitory computer-readable medium described herein, the control signaling further includes an indication of an association between respective radio network identifiers and each subset of scheduled cells.

In some examples of the method, apparatuses, and non-transitory computer-readable medium described herein, DCI includes scheduling information for one or more communications with the subset of scheduled cells.

In some examples of the method, apparatuses, and non-transitory computer-readable medium described herein, the control signaling further includes an indication of a respective carrier indicator associated with each scheduled cell of the set of scheduled cells and a determination of the scheduling information may be based on the indication of the respective carrier indicator associated with each scheduled cell of the set of scheduled cells.

Some examples of the method, apparatuses, and non-transitory computer-readable medium described herein may further include operations, features, means, or instructions for comparing the respective DCI payload sizes and generating the first comparison information based on the comparison of the respective DCI payload sizes.

Some examples of the method, apparatuses, and non-transitory computer-readable medium described herein may further include operations, features, means, or instructions for comparing the respective sets of CCEs and generating the second comparison information based on the comparison of the respective sets of CCEs.

DETAILED DESCRIPTION

Figure 1:
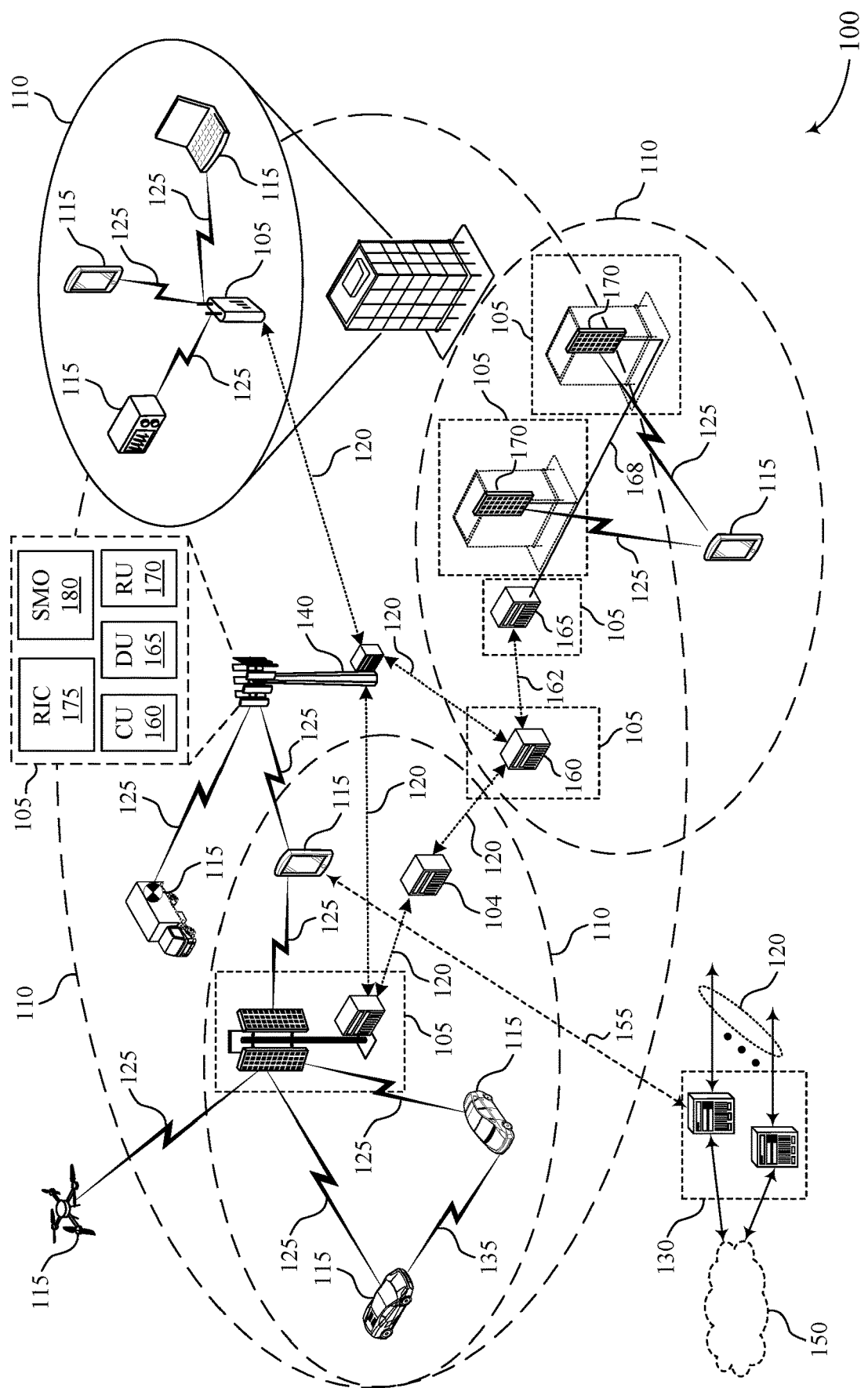
FIG. 1 illustrates an example of a wireless communications system that supports scheduled cell identification for multi-cell scheduling in accordance with one or more aspects of the present disclosure.

Some wireless communications may implement cross-carrier scheduling, where a downlink control information (DCI) received via a physical downlink control channel (PDCCH) occasion on a scheduling cell schedules a communication for a different cell (the scheduled cell). A cross-carrier DCI may include an indication of the scheduled cell in a carrier indication field (CIF). Some wireless communications systems may support multi-cell DCI (MC-DCI), meaning a single DCI received via a scheduling cell may schedule communications for more than one scheduled cells. As an MC-DCI conveys more information than a single-cell DCI in order to schedule communications on multiple cells, the overhead of a MC-DCI may be increased as compared to a single-cell DCI.

The overhead of a DCI may be reduced by compressing or removing the CIF. For example, radio resource control (RRC) signaling may indicate, to a user equipment (UE), a DCI payload size, control channel elements (CCE)s, and/or PDCCH candidates per scheduled cell or per group of scheduled cells. If the DCI payload sizes, CCEs, and/or PDCCH candidates are different for the scheduled cells indicated in the RRC, the UE may determine to which scheduled cell(s) a DCI received in a PDCCH monitoring occasion applies based on the payload size and/or CCEs of the PDCCH monitoring occasion without using a CIF field. Accordingly, the size of the DCI may be reduced by removing the CIF field.

In some aspects, if the DCI payload sizes, CCEs, and PDCCH candidates for two or more scheduled cells or groups of scheduled cells are the same, the UE may determine the scheduled cell(s) for a PDCCH monitoring occasion without a CIF based on one or more configured rules. For example, if the DCI payload size, the CCEs, and the PDCCH monitoring occasion matches two or more scheduled cells or groups of scheduled cells, the UE may determine that the PDCCH monitoring occasion corresponds to the scheduled cell(s) with the lower/higher component carrier index, the lower/higher subcarrier spacing (SCS), the group of scheduled cells that includes the Primary cell, the group of scheduled cells that includes the scheduling cell, or the group of cells that includes the most/least amount of cells.

In some aspects, if the DCI payload sizes, CCEs, and PDCCH candidates for two or more scheduled cells or groups of scheduled cells are the same, the UE may determine the corresponding scheduled cell or group of scheduled cells for a PDCCH monitoring occasion without a CIF based on determining the radio network temporary identifier (RNTI) that was used to scramble the cyclic redundancy check (CRC) for the PDCCH monitoring occasion and matching the RNTI to a scheduled cell or group of scheduled cells.

Aspects of the disclosure are initially described in the context of wireless communications systems. Aspects of the disclosure are further illustrated by and described with reference to scheduling diagrams, resource diagrams, and process flows. Aspects of the disclosure are further illustrated by and described with reference to apparatus diagrams, system diagrams, and flowcharts that relate to scheduled cell identification for multi-cell scheduling.

FIG. 1 illustrates an example of a wireless communications system 100 that supports scheduled cell identification for multi-cell scheduling in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support scheduled cell identification for multi-cell scheduling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., CCEs) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector)

over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1: M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a CRC), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may implement cross-carrier scheduling and/or multi-cell scheduling by a single DCI (e.g., MC-DCI). The overhead of a DCI may be reduced by compressing or removing the CIF. For example, RRC may indicate, to a UE 115, a DCI payload size, CCEs, and/or PDCCH candidates per scheduled cell or per group of scheduled cells. If the DCI payload sizes, CCEs, and/or PDCCH candidates are different for the scheduled cells indicated in the RRC signaling, the UE 115 may determine to which scheduled cell(s) a DCI received in a PDCCH monitoring occasion applies based on the payload size and/or CCEs of the PDCCH monitoring occasion without using a CIF field. Accordingly, the size of the DCI may be reduced by removing the CIF field.

In some aspects, if the DCI payload sizes, CCEs, and PDCCH candidates for two or more scheduled cells or groups of scheduled cells are the same, the UE 115 may determine the scheduled cell(s) for a PDCCH monitoring occasion without a CIF based on one or more configured rules. For example, if the DCI payload size, the CCEs, and the PDCCH monitoring occasion matches two or more scheduled cells or groups of scheduled cells, the UE 115 may determine that the PDCCH monitoring occasion corresponds to the scheduled cell(s) with the lower/higher component carrier index, the lower/higher SCS, the group of scheduled cells that includes the Primary cell, the group of scheduled cells that includes the scheduling cell, or the group of cells that includes the most/least amount of cells.

In some aspects, if the DCI payload sizes, CCEs, and PDCCH candidates for two or more scheduled cells or groups of scheduled cells are the same, the UE 115 may determine the corresponding scheduled cell or group of scheduled cells for a PDCCH monitoring occasion without a CIF based on determining the RNTI that was used to scramble the CRC for the PDCCH monitoring occasion and matching the RNTI to a scheduled cell or group of scheduled cells.

Figure 2:
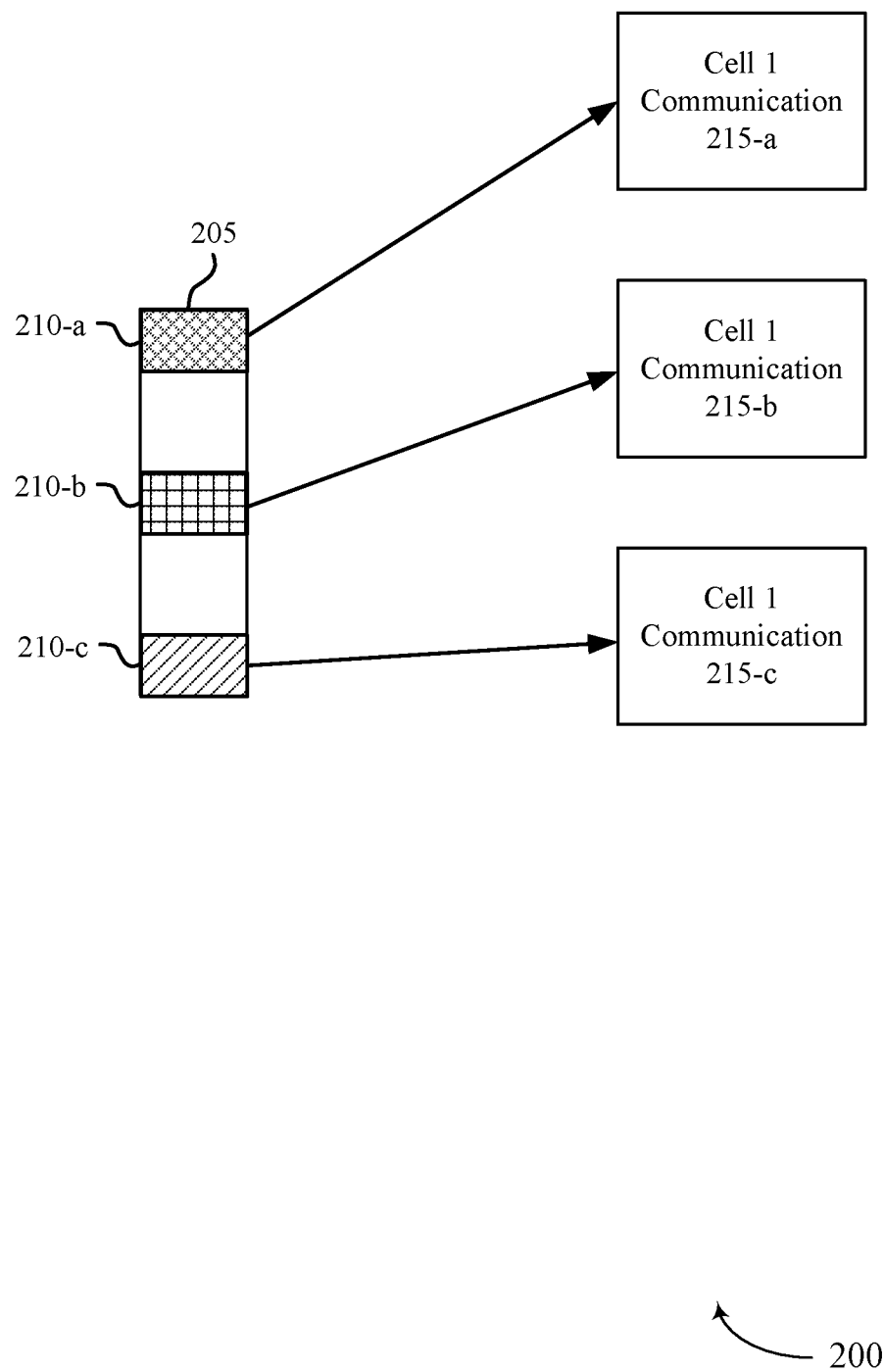
FIG. 2 illustrates an example of a scheduling diagram that supports scheduled cell identification for multi-cell scheduling in accordance with one or more aspects of the present disclosure.

FIG. 2 illustrates an example of a scheduling diagram 200 that supports scheduled cell identification for multi-cell scheduling in accordance with one or more aspects of the present disclosure. In some aspects, the scheduling diagram 200 may implement aspects of wireless communications systems 100.

In a self-scheduling mode, a DCI received in a PDCCH occasion via a carrier includes scheduling information for a data communication for that carrier. An RRC message may indicate the number of blind decoding (BD) capabilities and the number of CCEs the UE may process per PDCCH occasion. The RRC may indicate up to 6 different DCI formats (e.g., 4 of 0_1, 1_1, 1_1, 0_2, and 1_2) for a given PDCCH occasion and a UE may process up to 3 payload sizes of DCI formats for cell-RNTI (C-RNTI) and 1 DCI payload size for the other RNTIs for a cell.

In a cross-carrier scheduling mode, as shown in the scheduling diagram 200, on carrier is used to schedule data communications on different carriers. For example, in a PDCCH occasion 205, a first DCI 210-*a* may schedule a data communication 215-*a* on a first carrier (e.g., cell), a second DCI 210-*b* may schedule a data communication 215-*b* on a second carrier, and a third DCI 210-*c* may schedule a data communication 215-*c* on a third carrier. An RRC message may indicate the number of BD capabilities and the number of CCEs the UE may process per PDCCH occasion. The RRC may indicate up to 6 different DCI formats (e.g., 4 of 0_0, 1_0, 1_1, 0_2, and 1_2) for a given PDCCH occasion and a UE may process up to 3 payload sizes of DCI formats for C-RNTI and 1 DCI payload size for the other RNTIs for a scheduled cell. A parameter nci differentiates the DCI (e.g., the first DCI 210-*a*, the second DCI 210-*b*, or the third DCI 210-*c*) for the scheduled cells. In other words, nci is used to distinguish which DCI is associated with which scheduled cell.

Cross-carrier scheduling may be configured by the RRC field CrossCarrierSchedulingConfig, which may be configured for each scheduled cell. If the CrossCarrierScheduling-Config is configured with a parameter "other," that indicates to the UE that the scheduled cell is configured for cross-carrier scheduling. The CrossCarrierSchedulingConfig field may provide which cell is the scheduling cell and the CIF/$n_{ci}$ associated with the scheduled cell. For example, a field schedulingCellID may indicate the serving cell index to indicate the scheduling cell and a field cif-InSchedulingCell may indicate the CIF/$n_{ci}$ associated with the scheduled cell.

A given PDCCH occasion may include a quantity of CCEs, and the $n_{ci}$ may indicate which CCEs to monitor for a given scheduled cell. For example, for a search space set s associated with a control resource set (CORESET) p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by equation 1, where for any common search space (CSS), $Y_{p,n_{s,f}^{\mu}}$=0; for a UE-specific search space (USS), $Y_{p,n_{s,f}^{\mu}}=(A_p \cdot Y_{p,n_{s,f}^{\mu}-1})$modD, $Y_{p,-1}=n_{RNTI}\neq 0$, $A_p$=39827 for pmod3=0, $A_p$=39829 for pmod3=1, $A_p$=39839 for pmod3=2, and D=65537; i=0, . . . , L−1; $N_{CCE,p}$ is the number of CCEs, numbered from 0 to $N_{CCE,p}$−1, in CORESET p and, if any, per resource block (RB) set; $n_{CI}$ is the carrier indicator field value if the UE is configured with a carrier indicator field by CrossCarrierSchedulingConfig for the serving cell on which PDCCH is monitored; otherwise, including for any CSS, $n_{CI}$=0, $m_{s,n_{CI}}$=0, . . . $M_{s,n_{CI}}^{(L)}$−1, where $M_{s,n_{CI}}^{(L)}$ is the number of PDCCH candidates the UE is configured to monitor for aggregation level L of a search space set s for a serving cell corresponding to $n_{CI}$; for any CSS, $M_{s,max}^{(L)}=M_{s,0}^{(L)}$; for a USS, $M_{s,max}^{(L)}$ is the maximum of $M_{s,n_{CI}}^{(L)}$ over all configured $n_{CI}$ values for a CCE aggregation level L of search space set s.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad (1)$$

For cross-carrier scheduling, although the UE monitors PDCCH on the same scheduling cell for multiple scheduled cells, CCEs for PDCCH candidates for different scheduled cells may not be overlapped (as long as there are a sufficient number of CCEs in the CORESET). For example, Table 1 below shows an example with 96 CCEs, L=4, and M=4 for 3 scheduled cells with $n_{ci}$=0, 1, and 2, respectively, and where $Y_P$=0.

TABLE 1

| $n_{ci}$ (scheduled cell) | M (index of PDCCH candidate) | CCE indexes for the PDCCH candidate |
|---|---|---|
| 0 | 1 | 0-3 |
|   | 2 | 24-27 |
|   | 3 | 48-51 |
|   | 4 | 72-75 |
| 1 | 1 | 4-7 |
|   | 2 | 28-31 |
|   | 3 | 52-55 |
|   | 4 | 76-79 |
| 2 | 1 | 8-11 |
|   | 2 | 32-35 |
|   | 3 | 56-59 |
|   | 4 | 80-83 |

Figure 3:
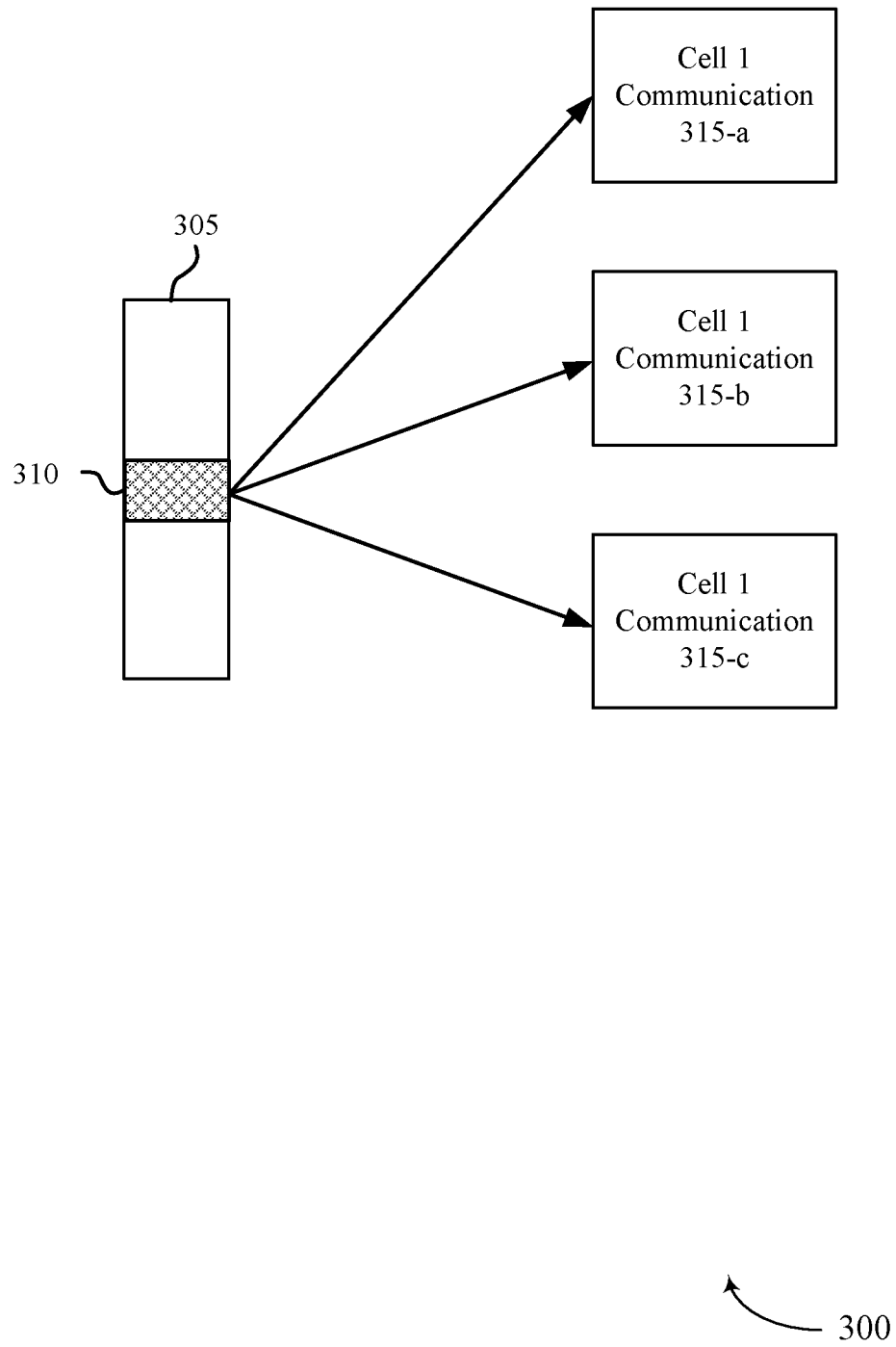
FIG. 3 illustrates an example of a scheduling diagram that supports scheduled cell identification for multi-cell scheduling in accordance with one or more aspects of the present disclosure.

FIG. 3 illustrates an example of a scheduling diagram 300 that supports scheduled cell identification for multi-cell scheduling in accordance with one or more aspects of the present disclosure. In some aspects, the scheduling diagram 300 may implement aspects of wireless communications systems 100.

An MC-DCI 310 received in a PDCCH occasion 305 may schedule communications (e.g., physical downlink shared channel (PDSCH) or physical uplink shared channel (PUSCH) transmissions) on more than one cell via the same MC-DCI 310. For example, the MC-DCI 310 may schedule a first communication 315-*a* on a first cell, a second communication 315-*b* on a second cell, and a third communication 315-*c* on a third cell. An RRC message may indicate the number of BD capabilities and the number of CCEs the UE may process per PDCCH occasion. MC-DCI may be implemented in intra-band or inter-band carrier aggregation operations. MC-DCI may be implemented in frequency range 1 (FR1) or frequency range 2 (FR2). In some aspects, a single MC-DCI may be used for 3 or more cells for multi-cell PUSCH and/or PDSCH scheduling.

A UE may determine whether a PDCCH candidate is being used for a MC-DCI or a single-cell DCI before the UE decodes the PDCCH candidate. The CIF/$n_{ci}$ framework may be used to indicate whether a PDCCH candidate is being used for a MC-DCI or a single-cell DCI. For example, RRC may configure an association between a CIF/$n_{ci}$ value and a set of cells that may be scheduled by an MC-DCI. For example, in Table 2 below, CIF/$n_{ci}$ value 2 is configured to be associated with cells 2, 3, and 4 (e.g., indicates a MC-DCI for cells 2, 3, and 4), CIF/$n_{ci}$ value 1 is configured to be associated with cell 1 (e.g., indicates single-cell DCI for cell 1), and CIF/$n_{ci}$ value 0 is configured to be associated with cell 0 (e.g., indicates single-cell DCI for cell 0). Accordingly, in the scenario shown in Table 2, an MC-DCI has a CIF field that indicates a value 2 when the MC-DCI targets cells 2, 3, and 4 as co-scheduled cells. For example, Table 2 shows an example with 96 CCEs, L=4, and M=4 for 5 scheduled cells with $n_{ci}$=0, 1, and 2, (where value 2 is associated with cells 2, 3, and 4), and where $Y_p$=0.

TABLE 2

| $n_{ci}$ (scheduled cells) | M (index of PDCCH candidate) | CCE indexes for the PDCCH candidate |
| --- | --- | --- |
| 0 | 1 | 0-3 |
| (0) | 2 | 24-27 |
|  | 3 | 48-51 |
|  | 4 | 72-75 |
| 1 | 1 | 4-7 |
| (1) | 2 | 28-31 |
|  | 3 | 52-55 |
|  | 4 | 76-79 |
| 2 | 1 | 8-11 |
| (2, 3, 4) | 2 | 32-35 |
|  | 3 | 56-59 |
|  | 4 | 80-83 |

Figure 4:
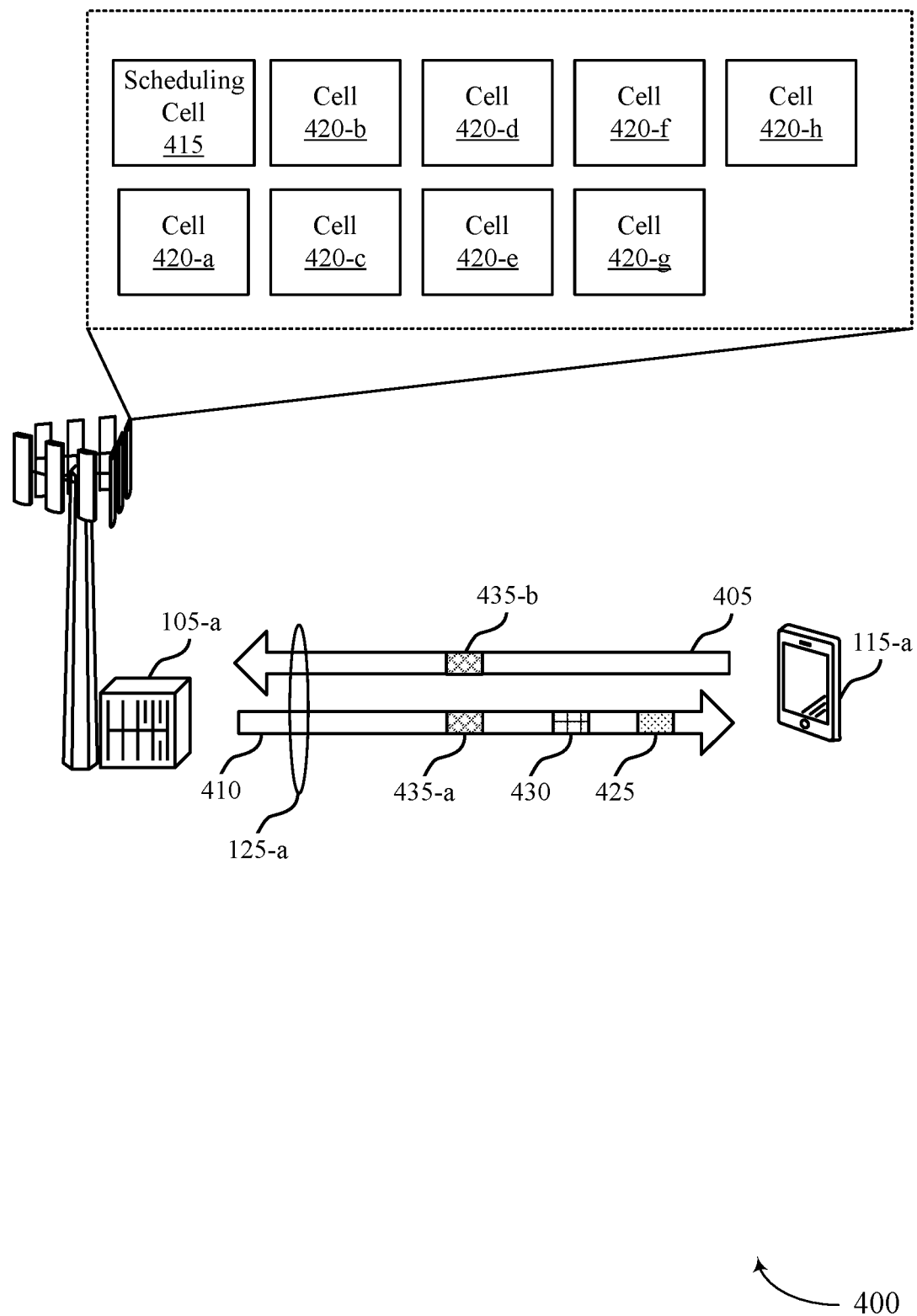
FIG. 4 illustrates an example of a wireless communications system that supports scheduled cell identification for multi-cell scheduling in accordance with one or more aspects of the present disclosure.

FIG. 4 illustrates an example of a wireless communications system 400 that supports scheduled cell identification for multi-cell scheduling in accordance with one or more aspects of the present disclosure. The wireless communications system 400 may implement aspects of wireless communications system 100. The wireless communications system 400 may include a UE 115-*a*, which may be an example of a UE 115 as described herein. The wireless communications system 400 may include a network entity 105-*a*, which may be an example of a network entity 105 as described herein.

The UE 115-*a* may communicate with the network entity 105-*a* using a communication link 125-*a*, which may be an example of an NR or LTE link between the UE 115-*a* and the network entity 105-*a*. The communication link 125-*a* may include a bi-directional link that enables both uplink and downlink communication. For example, the UE 115-*a* may transmit uplink transmissions 405, such as uplink control signals or uplink data signals, to the network entity 105-*a* using the communication link 125-*a* and the network entity 105-*a* may transmit downlink transmissions 410, such as downlink control signals or downlink data signals, to the UE 115-*a* using the communication link 125-*a*.

The wireless communications system 400 may implement multi-cell scheduling with a single DCI 430 as described herein. For example, a DCI 430 received via a scheduling cell 415 may schedule communications (e.g., a downlink communication 435-*a* or an uplink communication 435-*b*) with one or more of the scheduling cell 415, a first cell 420-*a*, a second cell 420-*b*, a third cell 420-*c*, a fourth cell 420-*d*, a fifth cell 420-*e*, a sixth cell 420-*f*, a seventh cell 420-*g*, or an eighth cell 420-*h*.

As an MC-DCI conveys more information than a single-cell DCI in order to schedule communications on the multiple cells, the overhead of an MC-DCI may be higher as compared to a single-cell DCI. To compress the overhead of an MC-DCI, the CIF field may be compressed or removed. In some example wireless communications systems, however, CIF is configured to always be included in a scheduling DCI 430 so that the UE 115-*a* may determine which scheduled cell(s) a DCI 430 corresponds to. However, other means may be used to distinguish whether a DCI 430 decoded on a set of CCEs is for particular scheduled cell(s) without the use of a CIF, and accordingly, in some aspects, the CIF field may not be used (e.g., may be removed from the DCI 430).

For example, RRC signaling 425 may indicate the payload sizes, CCEs, and/or PDCCH occasions associated with different DCI formats for different cells or subsets of scheduled cells (e.g., one or more of the scheduling cell 415, the first cell 420-*a*, the second cell 420-*b*, the third cell 420-*c*, the fourth cell 420-*d*, the fifth cell 420-*e*, the sixth cell 420-*f*, the seventh cell 420-*g*, or the eighth cell 420-*h*). For example, if the payload sizes of DCI formats for different sets of scheduled cell(s) are not the same, the UE 115-*a* may identify for which scheduled cell(s) a decoded DCI 430 is intended based on the CRC check of the multiple hypotheses of the DCI sizes. As another example, if the sets of CCEs for the PDCCH candidates for different scheduled cell(s) are different, the UE 115-*a* may identify for which scheduled cell(s) a decoded DCI 430 is intended based on the CCEs where each PDCCH candidate is mapped. In other words, in some aspects, the CIF field may be used to identify the scheduled cell(s) if: (1) the payload of DCI formats for different scheduled cells is the same; and (2) the set of CCEs for PDCCH candidates for different scheduled cells is the same.

Accordingly in some aspects, the CIF field may be used to identify the scheduled cell(s) if: (1) the UE is configured to monitor two or more DCI formats, on the same scheduling cell, that are configured to schedule PDSCHs or PUSCHs on different (sets of) scheduled cells and the payload/size of the two or more DCI formats different (sets of) scheduled cells is the same; and (2) the UE is configured to decode a PDCCH candidate for one of the two or more DCI formats on a set of CCEs and another PDCCH candidate for another of the two or more DCI formats on the same set of CCEs on the same scheduling cell. Conditions (1) and (2) may be controlled via configurations in RRC signaling 425, and whether the conditions are met may be identified by the UE 115-*a* (and in some aspects by the network entity 105-*a*) by the configurations. For example, DCI payload size may depend on various parameters in fields PDSCH-Config, PUCCH-Config, or PUSCH-Config in RRC signaling 425. A set of CCEs for a PDCCH candidate may depend on parameters in the field PDCCH-Config in RRC signaling 425. In some aspects, the UE 115-a (and in some aspects the network entity 105-a) may compare DCI payload sizes associated with different scheduled cell(s) to generate payload size comparison information to determine whether condition (1) is met. In some aspects, the UE 115-a (and in some aspects the network entity 105-a) may compare CCEs associated with PDCCH candidates for the different DCI formats to generate CCE comparison information to determine whether condition (2) is met.

Figure 5:
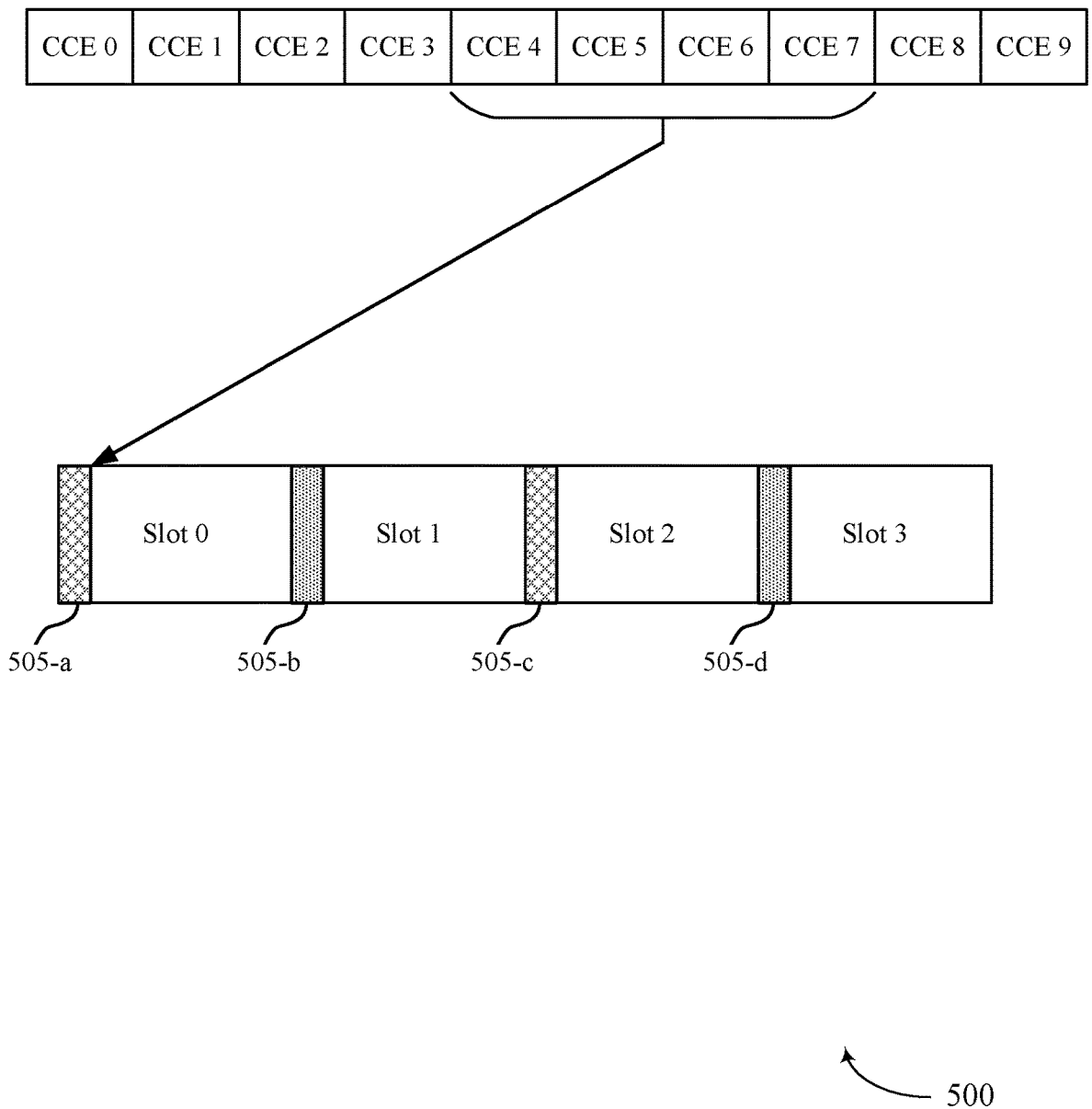
FIG. 5 illustrates an example of a resource diagram that supports scheduled cell identification for multi-cell scheduling in accordance with one or more aspects of the present disclosure.

In some aspects, the CIF field may be used to identify the scheduled cell(s) if: (1) the UE is configured to monitor two or more DCI formats, on the same scheduling cell, that are configured to schedule PDSCHs or PUSCHs on different (sets of) scheduled cells and the payload/size of the two or more DCI formats different (sets of) scheduled cells is the same; (2) the UE is configured to decode a PDCCH candidate for one of the two or more DCI formats on a set of CCEs and another PDCCH candidate for another of the two or more DCI formats on the same set of CCEs on the same scheduling cell; and (3) the PDCCH candidates for the two or more DCI formats are monitored at the same PDCCH monitoring occasion. Conditions (1), (2), and (3) may be controlled via configurations in RRC signaling 425, and whether the conditions are met may be identified by the UE 115-a (and in some aspects by the network entity 105-a) by the configurations. PDCCH monitoring occasions may be configured in the field PDCCH-Config in RRC signaling 425. As illustrated in FIG. 5, due to condition (3), if the PDCCH candidates are monitored in different periodicities for different DCI formats, a CIF field may be included in a DCI 430 in a PDCCH monitoring occasion when condition (3) is satisfied but may not be included in another DCI 430 in a PDCCH monitoring occasion where condition (3) is not satisfied.

In some aspects, a CIF may not be included in a DCI 430 even when conditions (1) and (2) (and in some aspects condition (3)) are satisfied (e.g., at least for MC-DCI). For example, the UE 115-a (and the network entity 105-a) may apply one or more rules to determine to which scheduled cell(s) a DCI 430 in a PDCCH monitoring occasion applies. For example, if the DCI payload size, the CCEs, and the PDCCH monitoring occasion matches two or more scheduled cells or groups of scheduled cells, the UE 115-a (and network entity 105-a) may determine that the PDCCH monitoring occasion corresponds to the scheduled cell(s) with the lower/higher component carrier index, the lower/higher SCS, the group of scheduled cells that includes the Primary cell, the group of scheduled cells that includes the scheduling cell 415, or the group of cells that includes the most/least amount of cells.

In some aspects, if the DCI payload sizes, CCEs, and PDCCH candidates for two or more scheduled cells or groups of scheduled cells are the same, the UE 115-a (and network entity 105-a) may determine the corresponding scheduled cell or group of scheduled cells for a PDCCH monitoring occasion without a CIF based on determining the RNTI that was used to scramble the CRC parity bits) for the PDCCH monitoring occasion and matching the RNTI to a scheduled cell or group of scheduled cells. For example, the UE 115-a may be configured with a UE-specific (virtual) RNTI value (e.g., via the RRC signaling 425) that is used to scramble the CRC of PDCCH. If conditions (1) and (2) (or conditions (1), (2), and (3)) are satisfied, the UE 115-a may check both legacy RNTI(s) (e.g., C-RNTI, configured scheduling RNTI (CS-RNTI), modulation and coding scheme cell RNTI (MCS-C-RNTI)) and the additional UE-specific (virtual) RNTI. Depending on which RNTI was used to scramble the CRC, the UE 115-a may identify which DCI format was used in the PDCCH monitoring occasion (and accordingly to which scheduled cell(s) the DCI 430 applies). The RRC signaling 425 may configure an association between a DCI format and the additional UE-specific virtual RNTI.

In some aspects, the $n_{ci}$ value in equation 1 used to determine which CCEs correspond to which DCI formats (and accordingly which scheduled cell(s) may be independent of the CIF field in a DCI 430, for example, because the DCI 430 may not include a CIF field. An $n_{ci}$ value may be indicated in RRC signaling 425 per scheduled cell or group of scheduled cells (e.g., for MC-DCI). If a CIF field is present in DCI 430, the CIF field matches the $n_{ci}$ value for the scheduled cell or group of scheduled cells.

In some aspects, the term DCI format 0_X may be used for an MC-DCI scheduling multiple PUSCHs on multiple cells with one PUSCH per cell. In some aspects, the term DCI format 1_X may be used for an MC-DCI scheduling multiple PDSCHs on multiple cells with one PDSCH per cell. Different transport blocks (TB)s may be scheduled on different cells by a DCI having DCI format 0_X or DCI format 1_X. In some aspects, fallback DCI (e.g., DCI formats 0_0 and 1_0) may not support multi-cell scheduling. In some aspects, the DCI form multi-cell scheduling may be monitored only in a USS set. In some aspects, a PDSCH may not be scheduled by a DCI having DCI format 0_X. In some aspects, a PUSCH may not be scheduled by a DCI having DCI format 1_X. In some aspects, all of the co-scheduled cells by a DCI having DCI format 1_X and the scheduling cell may be included in the same physical uplink control channel (PUCCH) group. In some aspects, all of the co-scheduled cells by a DCI having DCI format 0_X and the scheduling cell may be included in the same cell or PUCCH group. In some aspects, a DCI having a DCI format 0-X or 1-X on a scheduling cell may be used to schedule PUSCHs or PDSCHs on multiple cells including the scheduling cell. In some aspects, a DCI having a DCI format 0-X or 1-X on a scheduling cell may be used to schedule PUSCHs or PDSCHs on multiple cells not including the scheduling cell. In some aspects, for the UE 115-a, the maximum number of cells scheduled by a DCI having DCI format 0_X may be the same or different than the maximum number of cells scheduled by a DCI having DCI format 1_X.

In some aspects, one value for the maximum number of co-scheduled cells scheduled by a DCI having DCI format 0_X may be selected from {3, 4, 8}. In some aspects, one value for the maximum number of co-scheduled cells scheduled by a DCI having DCI format 0_X may be smaller than or equal to {3, 4, 8}. In some aspects, one value for the maximum number of co-scheduled cells scheduled by a DCI having DCI format 1_X may be selected from {3, 4, 8}. In some aspects, one value for the maximum number of co-scheduled cells scheduled by a DCI having DCI format 1_X may be smaller than or equal to {3, 4, 8}.

In some aspects, the DCI format 0_X may be used for single cell PUSCH scheduling. In some aspects, the DCI format 1_X may be used for single cell PDSCH scheduling. The UE 115-a may monitor one or both multi-cell scheduling DCI and single-cell scheduling DCI for a scheduled cell. In some aspects, DCI having DCI format 0_X or 1_X be transmitted via a Primary cell. In some aspects, DCI having DCI format 0_X or 1_X be transmitted via a Secondary cell, at least when the DCI having DCI format 0_X or 1_X does not schedule a PUSCH or PDSCH on the Primary cell.

FIG. 5 illustrates an example of a resource diagram 500 that supports scheduled cell identification for multi-cell scheduling in accordance with one or more aspects of the present disclosure. In some aspects, the resource diagram 500 may implement aspects of wireless communications systems 100 or 400.

A first PDCCH candidate for a DCI format X that schedules PDSCHs or PUSCHs on a cell set A may be monitored on every slot (e.g., in PDCCH monitoring occasion 505-a in slot 0, in PDCCH monitoring occasion 505-b in slot 1, in PDCCH monitoring occasion 505-c in slot 2, and in PDCCH monitoring occasion 505-d in slot 3). A second PDCCH candidate for a DCI format Y that schedules PDSCHs on a cell set B may be monitored on every other slot (e.g., in PDCCH monitoring occasion 505-a in slot 0 and in PDCCH monitoring occasion 505-c in slot 2). If the DCI formats X and Y are both associated with CCE 4, CCE 5, CCE 6 and CCE 7, and both have the same DCI payload size, the UE 115 may determine that the DCI received in PDCCH monitoring occasion 505-b and the DCI received in PDCCH monitoring occasion 505-d schedules PDSCHs or PUSCHs on a cell set A without a CIF as PDCCH monitoring occasion 505-b and PDCCH monitoring occasion 505-d are not configured for DCI format Y. For PDCCH monitoring occasion 505-a and PDCCH monitoring occasion 505-c, however, a CIF may be used to indicate whether a DCI in PDCCH monitoring occasion 505-a and PDCCH monitoring occasion 505-c schedules PDSCHs or PUSCHs on the cell set A or the cell set B (e.g., whether the DCI has DCI format X or DCI format Y).

Figure 6:
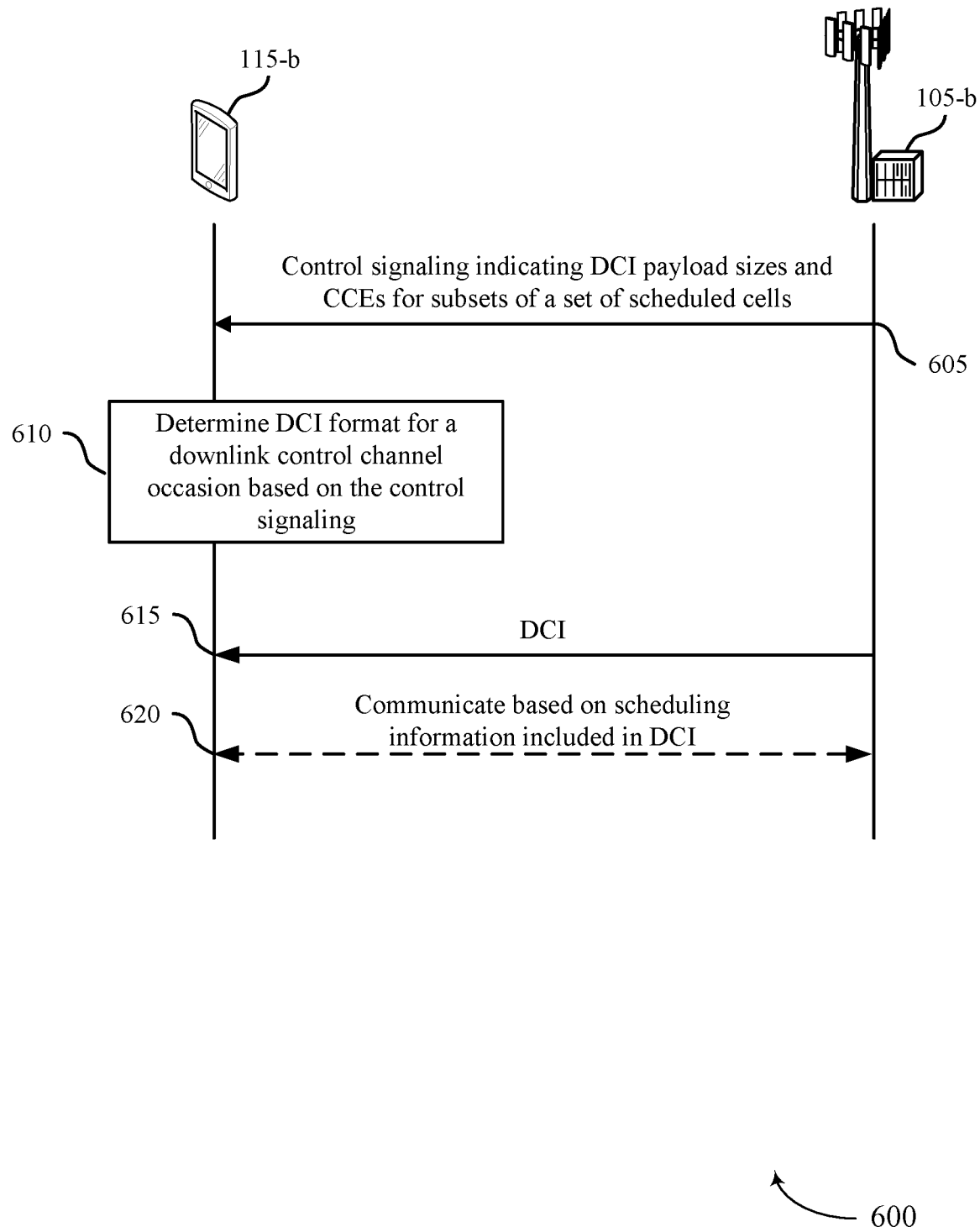
FIG. 6 illustrates an example of a process flow that supports scheduled cell identification for multi-cell scheduling in accordance with one or more aspects of the present disclosure.

FIG. 6 illustrates an example of a process flow 600 that supports scheduled cell identification for multi-cell scheduling in accordance with one or more aspects of the present disclosure. The process flow 600 may include a UE 115-b, which may be an example of a UE 115 as described herein. The process flow 600 may include a network entity 105-b, which may be an example of a network entity 105 as described herein. In the following description of the process flow 600, the operations between the network entity 105-b and the UE 115-b may be transmitted in a different order than the example order shown, or the operations performed by the network entity 105-b and the UE 115-b may be performed in different orders or at different times. Some operations may also be omitted from the process flow 600, and other operations may be added to the process flow 600.

At 605, the UE 115-b may receive, from the network entity 105-b, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells.

At 610, the UE 115-b (and in some aspects the network entity 105-b) may determine, based on first comparison information corresponding to the respective DCI payload sizes and second comparison information corresponding to the respective sets of CCEs, a DCI format for a downlink control channel monitoring occasion in the scheduling cell. The DCI format is associated with a subset of scheduled cells of the set of scheduled cells, and the DCI format includes an absence or a presence of an indication of the subset of scheduled cells.

At 615, the UE 115-b may receive, from the network entity 105-b via the DCI monitoring occasion, DCI in accordance with the determined DCI format.

In some aspects, the control signaling further includes an indication of a respective set of downlink control channels for each subset of scheduled cells, and third comparison information corresponds to the respective sets of downlink control channels. The UE 115-b (and in some aspects the network entity 105-b) may determine the DCI format based on the third comparison information.

In some aspects, the first comparison information is indicative that each respective DCI payload size for each subset of scheduled cells is different. Determining the DCI format may include determining the DCI format based on a payload size for the downlink control channel monitoring occasion that matches a respective DCI payload size of the subset of scheduled cells.

In some aspects, the second comparison information is indicative that each respective set of CCEs for each subset of scheduled cells is different. Determining the DCI format may include determining the DCI format based on a set of CCEs for the downlink control channel monitoring occasion that matches a respective set of CCEs for the subset of scheduled cells.

In some aspects, the first comparison information is indicative that at least two respective DCI payload sizes for at least two subsets of scheduled cells are equal, wherein the second comparison information is indicative that respective sets of CCEs for the at least two subsets of scheduled cells are equal. The UE 115-b (and in some aspects the network entity 105-b) may determine, based on the first comparison information being indicative that the at least two respective DCI payload sizes are equal and the second comparison information being indicative that the respective sets of CCEs are equal, that the DCI includes the presence of the indication of the subset of scheduled cells. The indication of the subset of scheduled cells may include an explicit indication of the subset of scheduled cells.

In some aspects, the first comparison information is indicative that at least two respective DCI payload sizes for at least two subsets of scheduled cells are equal, wherein the second comparison information is indicative that respective sets of CCEs for the at least two subsets of scheduled cells are equal. The UE 115-b (and in some aspects the network entity 105-b) may determine, based on the first comparison information being indicative that the at least two respective DCI payload sizes are equal and the second comparison information being indicative that the respective sets of CCEs are equal, that the DCI includes the presence of the indication of the subset of scheduled cells. The indication of the subset of scheduled cells may include a rule-based indication of the subset of scheduled cells. In some aspects, the rule-based indication includes information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

In some aspects, the first comparison information is indicative that at least two respective DCI payload sizes for at least two subsets of scheduled cells are equal, wherein the second comparison information is indicative that respective sets of CCEs for the at least two subsets of scheduled cells are equal. The UE 115-b (and in some aspects the network entity 105-b) may determine, based on the first comparison information being indicative that the at least two respective DCI payload sizes are equal and the second comparison information being indicative that the respective sets of CCEs are equal, that the DCI includes the presence of the indication of the subset of scheduled cells. The indication of the subset of scheduled cells may include a radio network identifier used to scramble a CRC of the downlink control channel monitoring occasion. In some aspects, the control signaling further includes an indication of an association between respective radio network identifiers and each subset of scheduled cells.

In some aspects, the DCI includes scheduling information for one or more communications with the subset of scheduled cells. At 620, the UE 115-*b* may communicate the one or more communications with the subset of scheduled cells. In some aspects, the control signaling further includes an indication of a respective carrier indicator associated with each scheduled cell of the set of scheduled cells, and a determination of the scheduling information is based on the indication of the respective carrier indicator associated with each scheduled cell of the set of scheduled cells.

In some aspects, the UE 115-*b* (and in some aspects the network entity 105-*b*) may compare the respective DCI payload sizes and generate the first comparison information based on the comparison of the respective DCI payload sizes. In some aspects, the UE 115-*b* (and in some aspects the network entity 105-*b*) may compare the respective sets of CCEs; and generate the second comparison information based on the comparison of the respective sets of CCEs.

Figure 7:
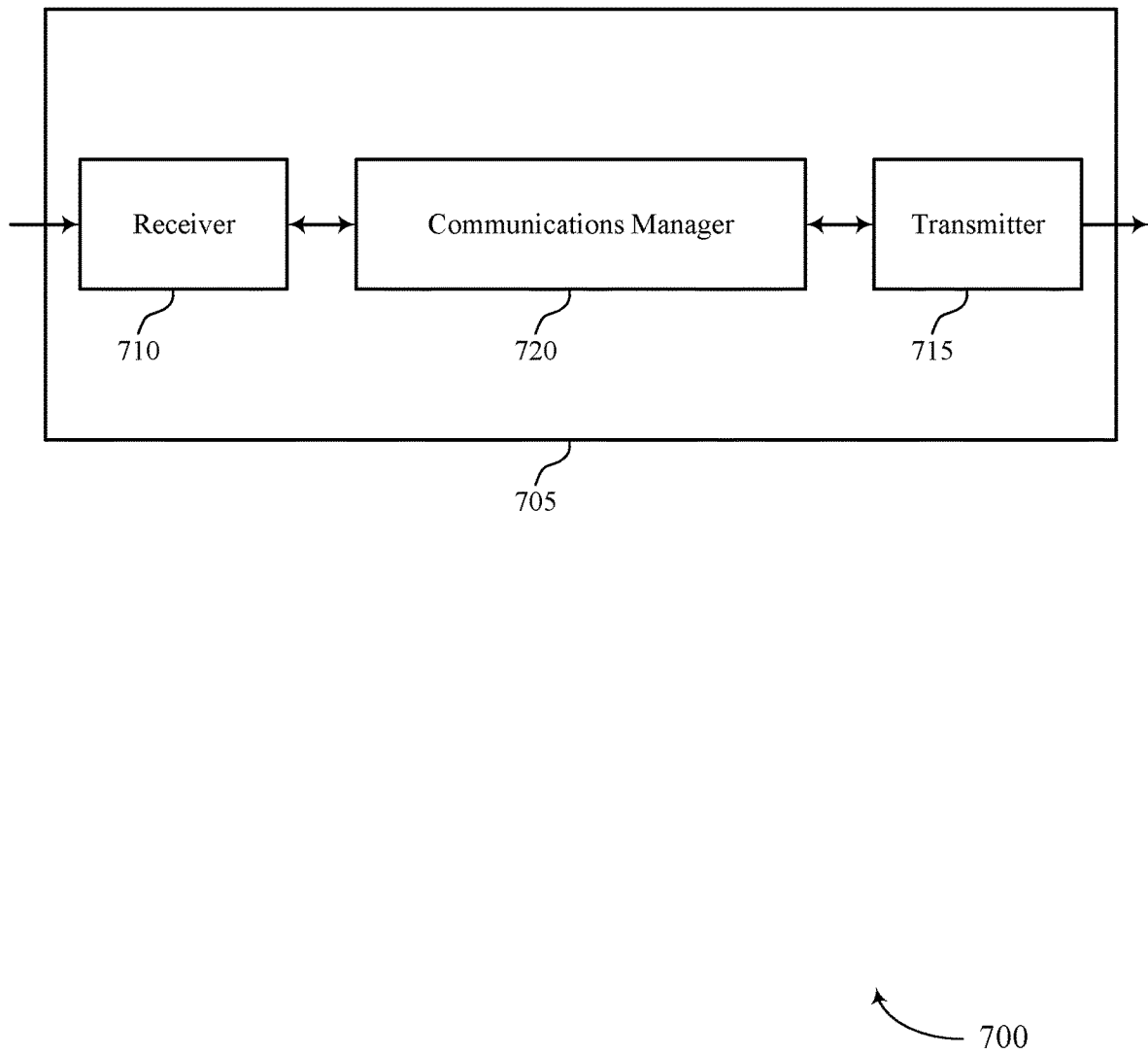
FIGS. 7 and 8 show block diagrams of devices that support scheduled cell identification for multi-cell scheduling in accordance with one or more aspects of the present disclosure.

FIG. 7 shows a block diagram 700 of a device 705 that supports scheduled cell identification for multi-cell scheduling in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to scheduled cell identification for multi-cell scheduling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to scheduled cell identification for multi-cell scheduling). In some aspects, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of scheduled cell identification for multi-cell scheduling as described herein. For example, the communications manager 720, the receiver 710, the transmitter 715, or various combinations or components thereof may support a method for performing one or more of the functions described herein.

In some aspects, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first network node in accordance with examples as disclosed herein. For example, the communications manager 720 may be configured as or otherwise support a means for receiving control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The communications manager 720 may be configured as or otherwise support a means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The communications manager 720 may be configured as or otherwise support a means for receiving, via the downlink control channel monitoring occasion, DCI in accordance with the determined DCI format.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:
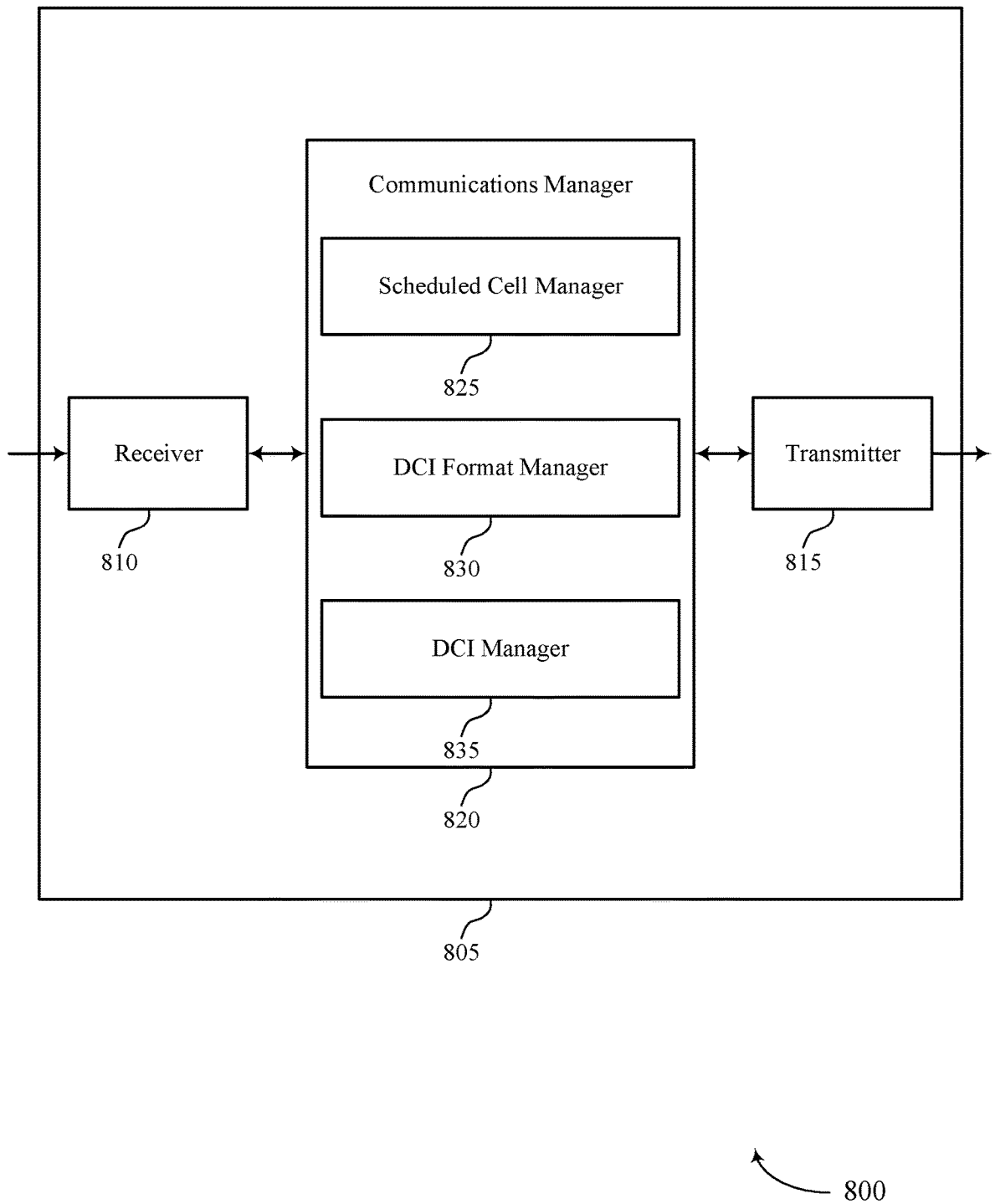

FIG. 8 shows a block diagram 800 of a device 805 that supports scheduled cell identification for multi-cell scheduling in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to scheduled cell identification for multi-cell scheduling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to scheduled cell identification for multi-cell scheduling). In some aspects, the transmitter 815 may be co-located with a receiver 810 in a transceiver module. The transmitter 815 may utilize a single antenna or a set of multiple antennas.

The device 805, or various components thereof, may be an example of means for performing various aspects of scheduled cell identification for multi-cell scheduling as described herein. For example, the communications manager 820 may include a scheduled cell manager 825, a DCI format manager 830, a DCI manager 835, or any combination thereof. The communications manager 820 may be an example of aspects of a communications manager 720 as described herein. In some aspects, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first network node in accordance with examples as disclosed herein. The scheduled cell manager 825 may be configured as or otherwise support a means for receiving control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The DCI format manager 830 may be configured as or otherwise support a means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The DCI manager 835 may be configured as or otherwise support a means for receiving, via the downlink control channel monitoring occasion, DCI in accordance with the determined DCI format.

Figure 9:
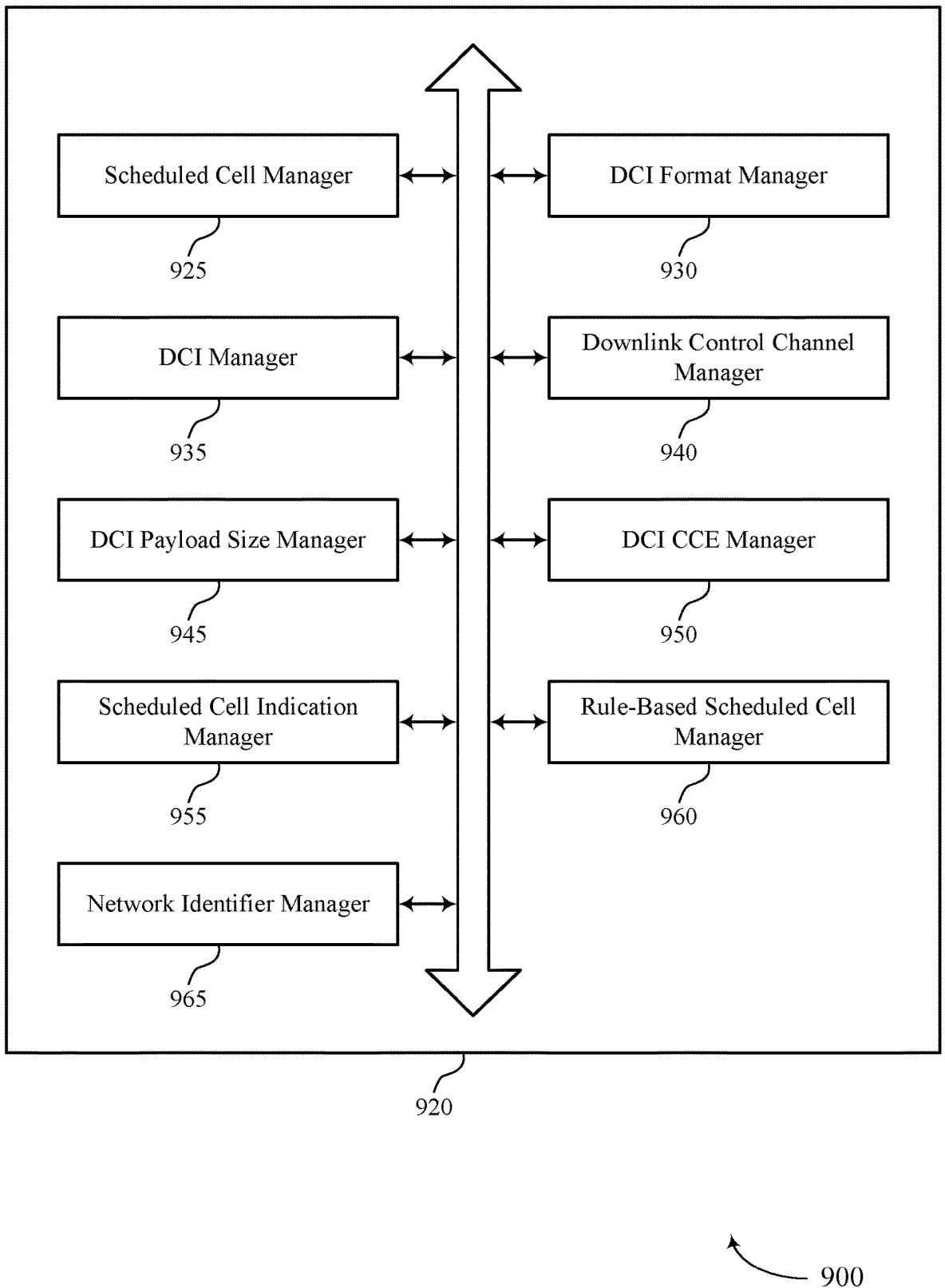
FIG. 9 shows a block diagram of a communications manager that supports scheduled cell identification for multi-cell scheduling in accordance with one or more aspects of the present disclosure.

FIG. 9 shows a block diagram 900 of a communications manager 920 that supports scheduled cell identification for multi-cell scheduling in accordance with one or more aspects of the present disclosure. The communications manager 920 may be an example of aspects of a communications manager 720, a communications manager 820, or both, as described herein. The communications manager 920, or various components thereof, may be an example of means for performing various aspects of scheduled cell identification for multi-cell scheduling as described herein. For example, the communications manager 920 may include a scheduled cell manager 925, a DCI format manager 930, a DCI manager 935, a downlink control channel manager 940, a DCI payload size manager 945, a DCI CCE manager 950, a scheduled cell indication manager 955, a rule-based scheduled cell manager 960, a network identifier manager 965, or any combination thereof. Each of these components may communicate, directly or indirectly, with one another (e.g., via one or more buses).

The communications manager 920 may support wireless communications at a first network node in accordance with examples as disclosed herein. The scheduled cell manager 925 may be configured as or otherwise support a means for receiving control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The DCI format manager 930 may be configured as or otherwise support a means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The DCI manager 935 may be configured as or otherwise support a means for receiving, via the downlink control channel monitoring occasion, DCI in accordance with the determined DCI format.

In some aspects, to support determining the DCI format, the downlink control channel manager 940 may be configured as or otherwise support a means for determining the DCI format based on the third comparison information.

In some aspects, to support determining the DCI format, the DCI payload size manager 945 may be configured as or otherwise support a means for determining the DCI format based on a payload size for the downlink control channel monitoring occasion that matches a respective DCI payload size of the subset of scheduled cells.

In some aspects, to support determining the DCI format, the DCI CCE manager 950 may be configured as or otherwise support a means for determining the DCI format based on a set of CCEs for the downlink control channel monitoring occasion that matches a respective set of CCEs for the subset of scheduled cells.

In some aspects, the scheduled cell indication manager 955 may be configured as or otherwise support a means for determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, where the indication of the subset of scheduled cells includes an explicit indication of the subset of scheduled cells.

In some aspects, the rule-based scheduled cell manager 960 may be configured as or otherwise support a means for determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, where the indication of the subset of scheduled cells includes a rule-based indication of the subset of scheduled cells.

In some aspects, the rule-based indication includes information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

In some aspects, the network identifier manager 965 may be configured as or otherwise support a means for determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, where the indication of the subset of scheduled cells includes a radio network identifier used to scramble a CRC of the downlink control channel monitoring occasion.

In some aspects, the control signaling further includes an indication of an association between respective radio network identifiers and each subset of scheduled cells.

In some aspects, DCI includes scheduling information for one or more communications with the subset of scheduled cells.

In some aspects, the control signaling further includes an indication of a respective carrier indicator associated with each scheduled cell of the set of scheduled cells. In some aspects, a determination of the scheduling information is based on the indication of the respective carrier indicator associated with each scheduled cell of the set of scheduled cells.

In some aspects, the DCI payload size manager 945 may be configured as or otherwise support a means for comparing the respective DCI payload sizes. In some aspects, the DCI payload size manager 945 may be configured as or otherwise support a means for generating the first comparison information based on the comparison of the respective DCI payload sizes.

In some aspects, the DCI CCE manager 950 may be configured as or otherwise support a means for comparing the respective sets of CCEs. In some aspects, the DCI CCE manager 950 may be configured as or otherwise support a means for generating the second comparison information based on the comparison of the respective sets of CCEs.

Figure 10:
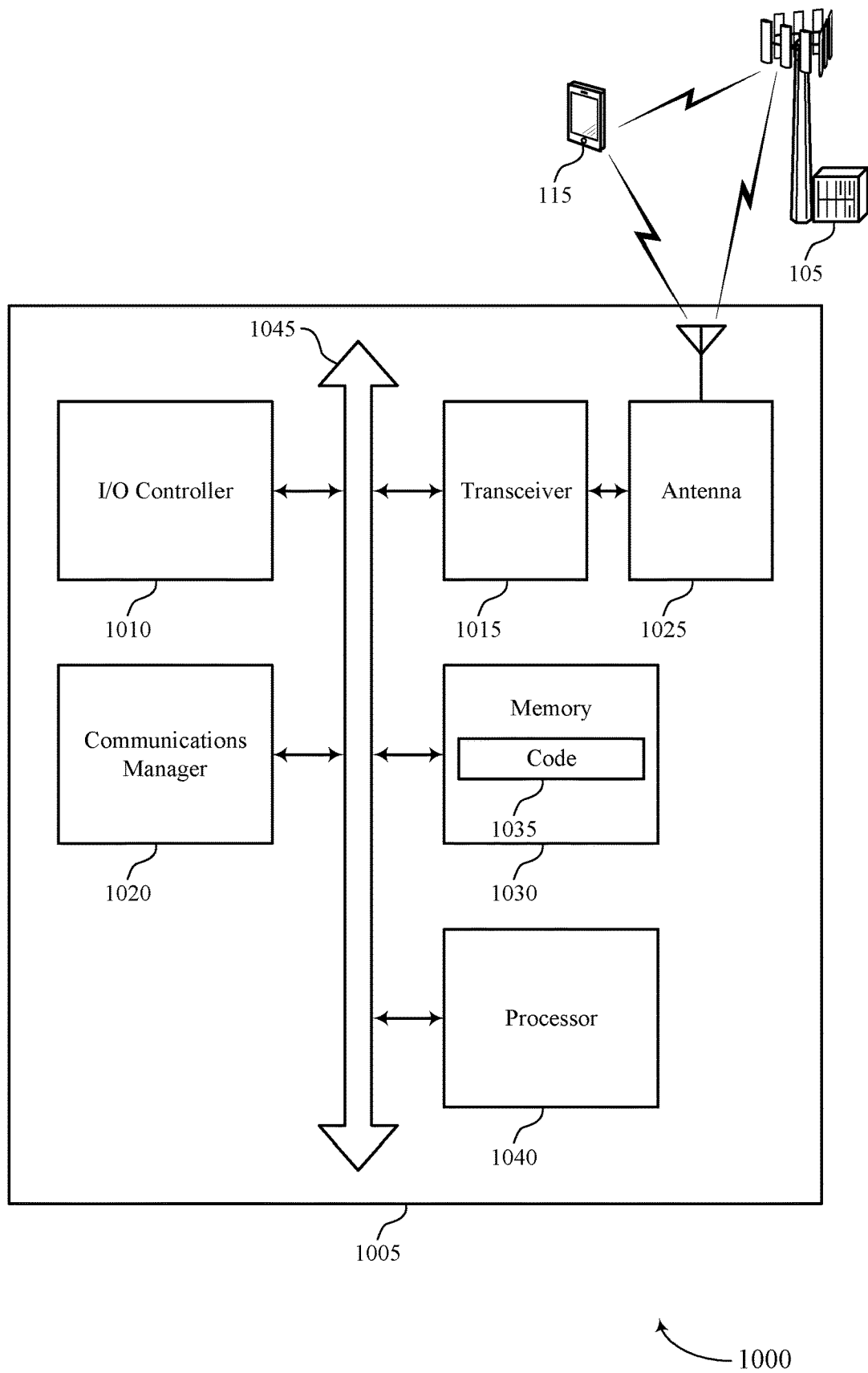
FIG. 10 shows a diagram of a system including a device that supports scheduled cell identification for multi-cell scheduling in accordance with one or more aspects of the present disclosure.

FIG. 10 shows a diagram of a system 1000 including a device 1005 that supports scheduled cell identification for multi-cell scheduling in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting scheduled cell identification for multi-cell scheduling). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first network node in accordance with examples as disclosed herein. For example, the communications manager 1020 may be configured as or otherwise support a means for receiving control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The communications manager 1020 may be configured as or otherwise support a means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The communications manager 1020 may be configured as or otherwise support a means for receiving, via the downlink control channel monitoring occasion, DCI in accordance with the determined DCI format.

By including or configuring the communications manager 1020 in accordance with examples as described herein, the device 1005 may support techniques for more efficient utilization of communication resources.

In some aspects, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some aspects, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of scheduled cell identification for multi-cell scheduling as described herein, or the processor 1040 and the memory 1030 may be otherwise configured to perform or support such operations.

Figure 11:
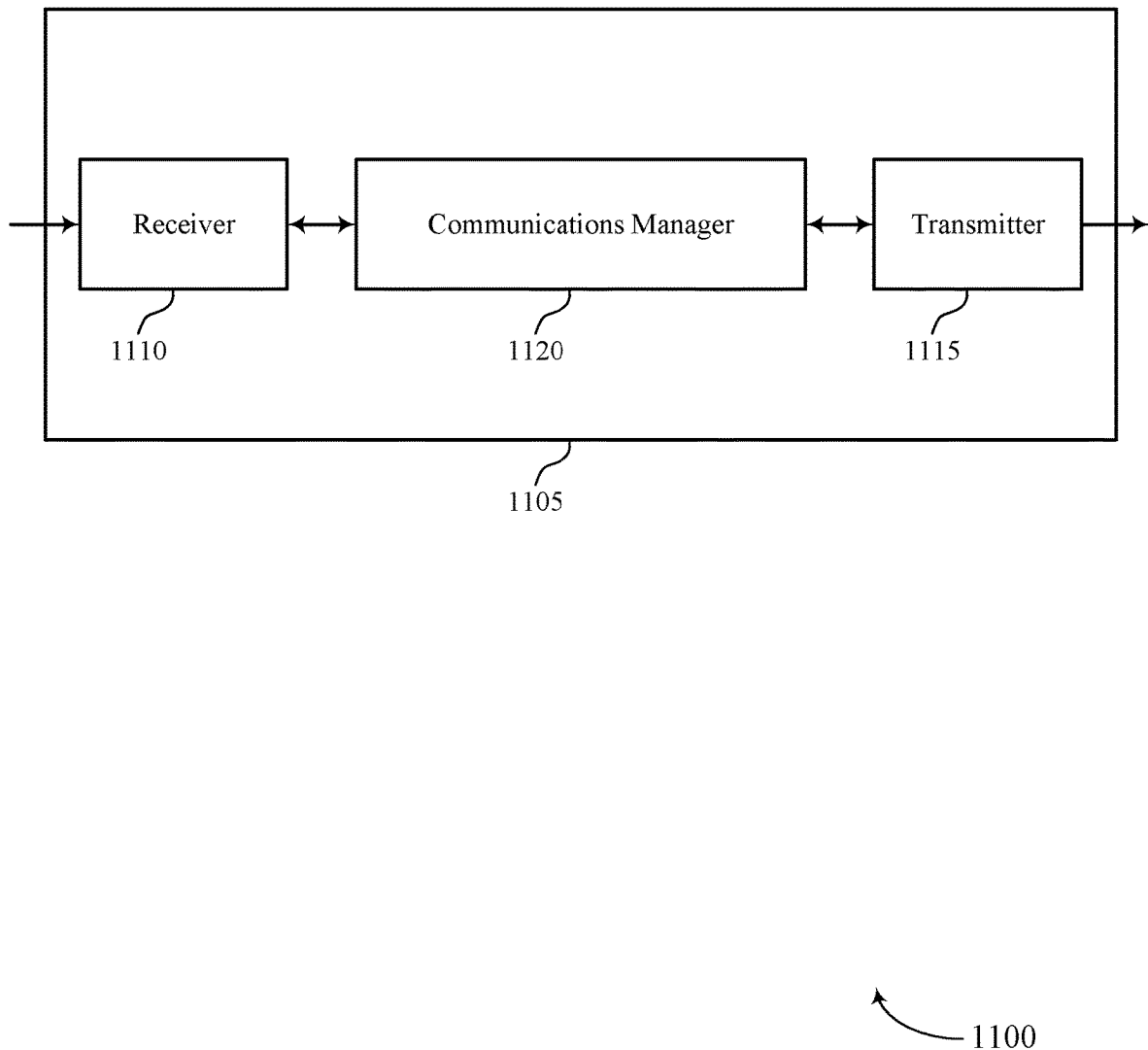
FIGS. 11 and 12 show block diagrams of devices that support scheduled cell identification for multi-cell scheduling in accordance with one or more aspects of the present disclosure.

FIG. 11 shows a block diagram 1100 of a device 1105 that supports scheduled cell identification for multi-cell scheduling in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some aspects, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some aspects, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of scheduled cell identification for multi-cell scheduling as described herein. For example, the communications manager 1120, the receiver 1110, the transmitter 1115, or various combinations or components thereof may support a method for performing one or more of the functions described herein.

In some aspects, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first network node in accordance with examples as disclosed herein. For example, the communications manager 1120 may be configured as or otherwise support a means for transmitting, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The communications manager 1120 may be configured as or otherwise support a means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The communications manager 1120 may be configured as or otherwise support a means for transmitting, via the downlink control channel monitoring occasion, a DCI in accordance with the determined DCI format.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources.

Figure 12:
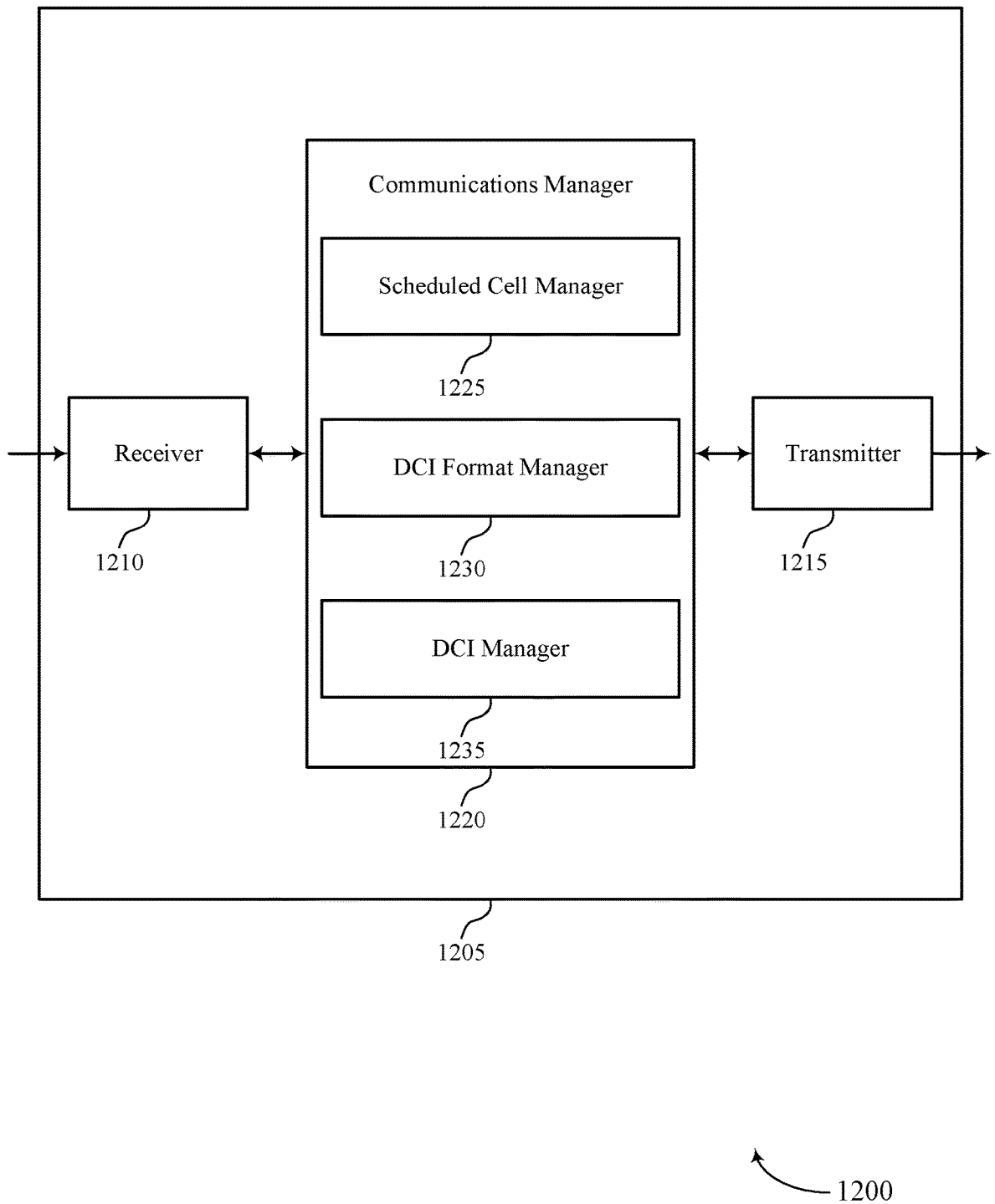

FIG. 12 shows a block diagram 1200 of a device 1205 that supports scheduled cell identification for multi-cell scheduling in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some aspects, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some aspects, the transmitter 1215 and the receiver 1210 may be co-located in a transceiver, which may include or be coupled with a modem.

The device 1205, or various components thereof, may be an example of means for performing various aspects of scheduled cell identification for multi-cell scheduling as described herein. For example, the communications manager 1220 may include a scheduled cell manager 1225, a DCI format manager 1230, a DCI manager 1235, or any combination thereof. The communications manager 1220 may be an example of aspects of a communications manager 1120 as described herein. In some aspects, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a first network node in accordance with examples as disclosed herein. The scheduled cell manager 1225 may be configured as or otherwise support a means for transmitting, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The DCI format manager 1230 may be configured as or otherwise support a means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The DCI manager 1235 may be configured as or otherwise support a means for transmitting, via the downlink control channel monitoring occasion, a DCI in accordance with the determined DCI format.

Figure 13:
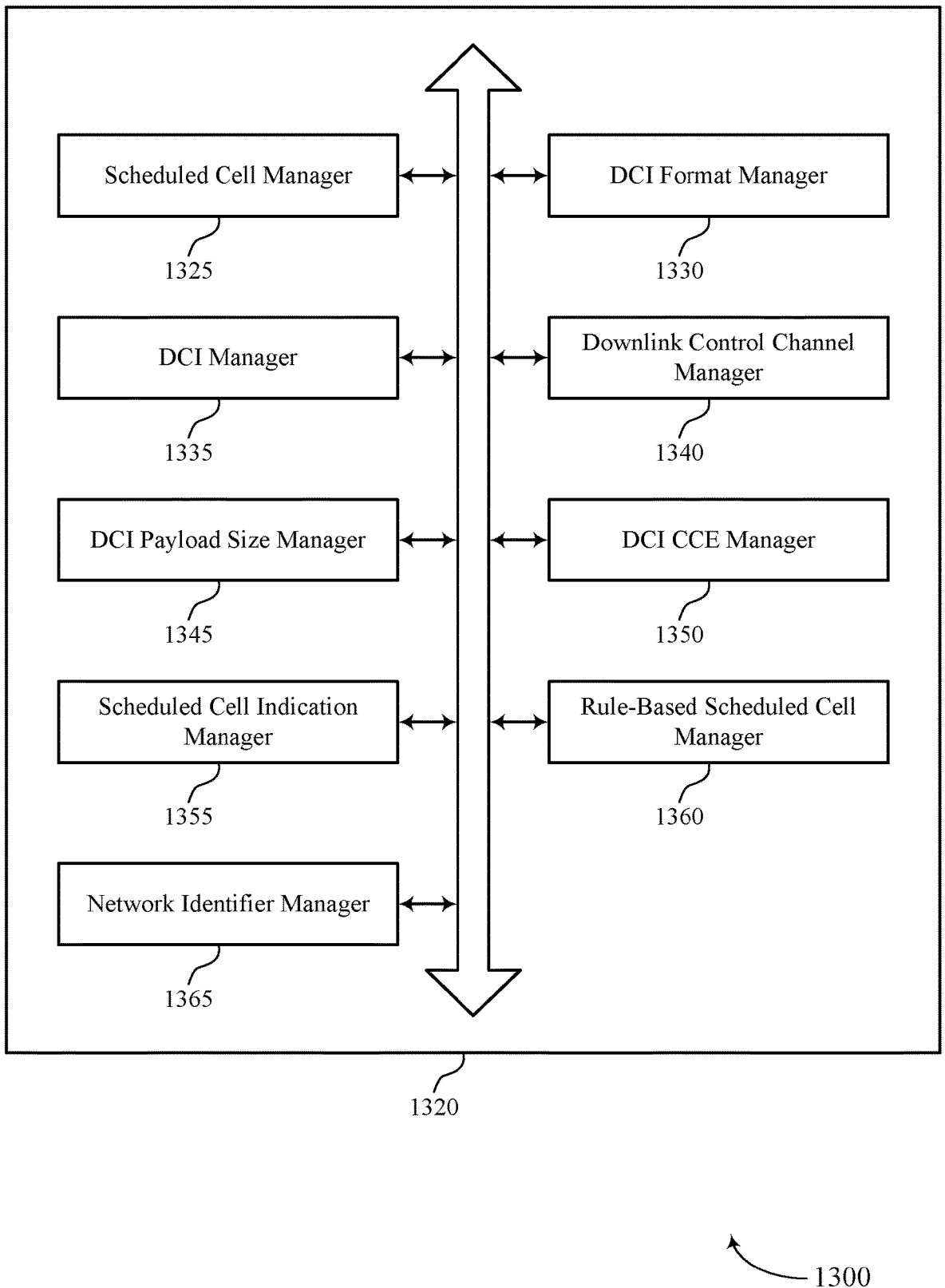
FIG. 13 shows a block diagram of a communications manager that supports scheduled cell identification for multi-cell scheduling in accordance with one or more aspects of the present disclosure.

FIG. 13 shows a block diagram 1300 of a communications manager 1320 that supports scheduled cell identification for multi-cell scheduling in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of scheduled cell identification for multi-cell scheduling as described herein. For example, the communications manager 1320 may include a scheduled cell manager 1325, a DCI format manager 1330, a DCI manager 1335, a downlink control channel manager 1340, a DCI payload size manager 1345, a DCI CCE manager 1350, a scheduled cell indication manager 1355, a rule-based scheduled cell manager 1360, a network identifier manager 1365, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a first network node in accordance with examples as disclosed herein. The scheduled cell manager 1325 may be configured as or otherwise support a means for transmitting, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The DCI format manager 1330 may be configured as or otherwise support a means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The DCI manager 1335 may be configured as or otherwise support a means for transmitting, via the downlink control channel monitoring occasion, a DCI in accordance with the determined DCI format.

In some aspects, to support determining the DCI format, the downlink control channel manager 1340 may be configured as or otherwise support a means for determining the DCI format based on the third comparison information.

In some aspects, to support determining the DCI format, the DCI payload size manager 1345 may be configured as or otherwise support a means for determining the DCI format based on a payload size for the downlink control channel monitoring occasion that matches a respective DCI payload size of the subset of scheduled cells.

In some aspects, to support determining the DCI format, the DCI CCE manager 1350 may be configured as or otherwise support a means for determining the DCI format based on a set of CCEs for the downlink control channel monitoring occasion that matches a respective set of CCEs for the subset of scheduled cells.

In some aspects, the scheduled cell indication manager 1355 may be configured as or otherwise support a means for determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, where the indication of the subset of scheduled cells includes an explicit indication of the subset of scheduled cells.

In some aspects, the rule-based scheduled cell manager 1360 may be configured as or otherwise support a means for determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, where the indication of the subset of scheduled cells includes a rule-based indication of the subset of scheduled cells.

In some aspects, the rule-based indication includes information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

In some aspects, the network identifier manager 1365 may be configured as or otherwise support a means for determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, where the indication of the subset of scheduled cells includes a radio network identifier used to scramble a CRC of the downlink control channel monitoring occasion.

In some aspects, the control signaling further includes an indication of an association between respective radio network identifiers and each subset of scheduled cells.

In some aspects, DCI includes scheduling information for one or more communications with the subset of scheduled cells.

In some aspects, the control signaling further includes an indication of a respective carrier indicator associated with each scheduled cell of the set of scheduled cells. In some aspects, a determination of the scheduling information is based on the indication of the respective carrier indicator associated with each scheduled cell of the set of scheduled cells.

In some aspects, the DCI payload size manager 1345 may be configured as or otherwise support a means for comparing the respective DCI payload sizes. In some aspects, the DCI payload size manager 1345 may be configured as or otherwise support a means for generating the first comparison information based on the comparison of the respective DCI payload sizes.

In some aspects, the DCI CCE manager 1350 may be configured as or otherwise support a means for comparing the respective sets of CCEs. In some aspects, the DCI CCE manager 1350 may be configured as or otherwise support a means for generating the second comparison information based on the comparison of the respective sets of CCEs.

Figure 14:
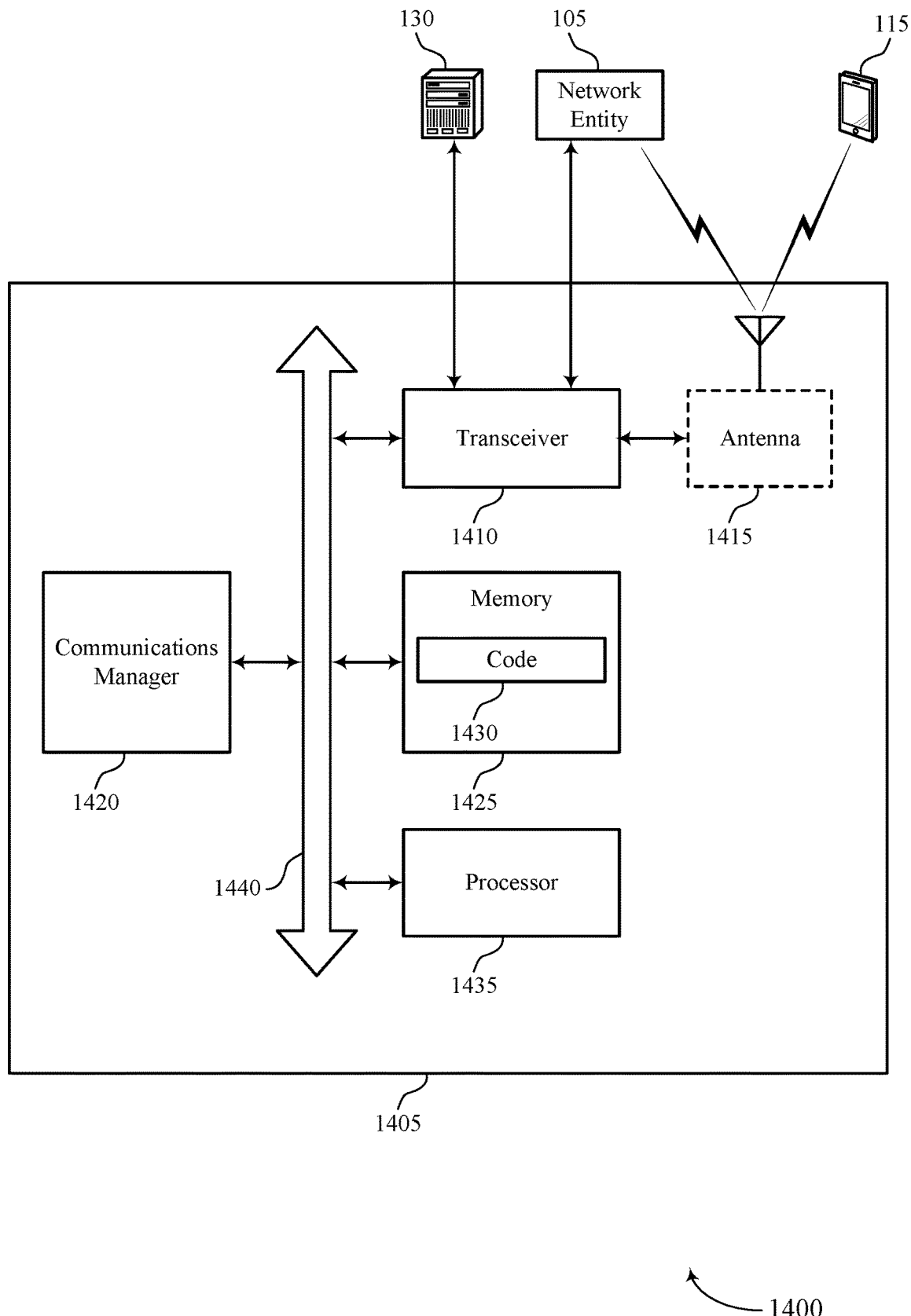
FIG. 14 shows a diagram of a system including a device that supports scheduled cell identification for multi-cell scheduling in accordance with one or more aspects of the present disclosure.

FIG. 14 shows a diagram of a system 1400 including a device 1405 that supports scheduled cell identification for multi-cell scheduling in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some aspects, the transceiver 1410 may include a wired transceiver and may communicate bi-directionally with another wired transceiver. Additionally, or alternatively, in some aspects, the transceiver 1410 may include a wireless transceiver and may communicate bi-directionally with another wireless transceiver. In some aspects, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some aspects, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting scheduled cell identification for multi-cell scheduling). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1440 may support communications of (e.g., within) a protocol layer of a protocol stack. In some aspects, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some aspects, the communications manager 1420 may manage aspects of communications with a core network 130 (e.g., via one or more wired or wireless backhaul links). For example, the communications manager 1420 may manage the transfer of data communications for client devices, such as one or more UEs 115. In some aspects, the communications manager 1420 may manage communications with other network entities 105, and may include a controller or scheduler for controlling communications with UEs 115 in cooperation with other network entities 105. In some aspects, the communications manager 1420 may support an X2 interface within an LTE/LTE-A wireless communications network technology to provide communication between network entities 105.

The communications manager 1420 may support wireless communications at a first network node in accordance with examples as disclosed herein. For example, the communications manager 1420 may be configured as or otherwise support a means for transmitting, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The communications manager 1420 may be configured as or otherwise support a means for determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The communications manager 1420 may be configured as or otherwise support a means for transmitting, via the downlink control channel monitoring occasion, a DCI in accordance with the determined DCI format.

By including or configuring the communications manager 1420 in accordance with examples as described herein, the device 1405 may support techniques for more efficient utilization of communication resources.

In some aspects, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some aspects, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of scheduled cell identification for multi-cell scheduling as described herein, or the processor 1435 and the memory 1425 may be otherwise configured to perform or support such operations.

Figure 15:
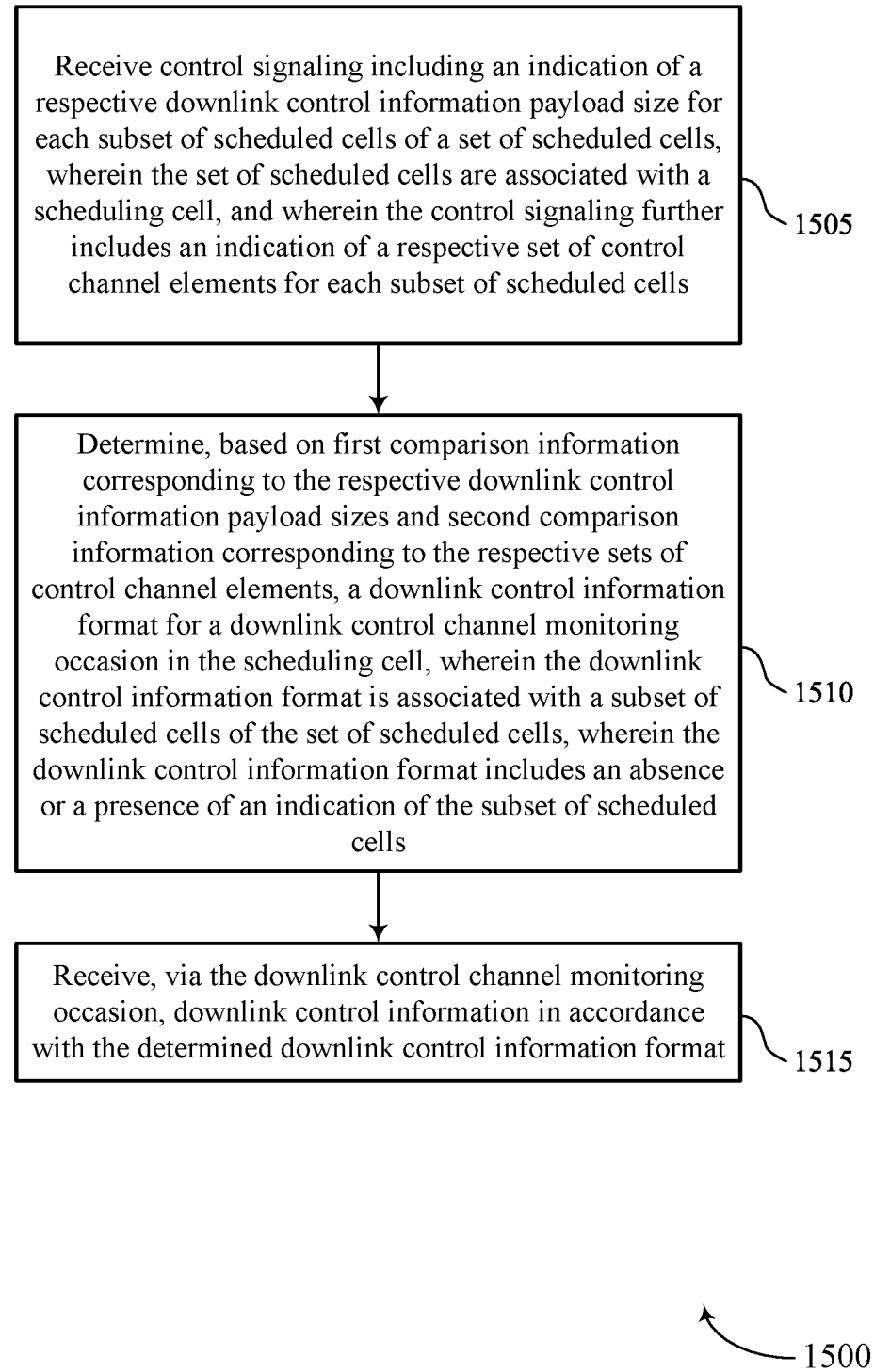
FIGS. 15 and 16 show flowcharts illustrating methods that support scheduled cell identification for multi-cell scheduling in accordance with one or more aspects of the present disclosure.

FIG. 15 shows a flowchart illustrating a method 1500 that supports scheduled cell identification for multi-cell scheduling in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some aspects, a UE may execute a set of instructions to control the functional elements of the UE to perform the described functions. Additionally, or alternatively, the UE may perform aspects of the described functions using special-purpose hardware.

At 1505, the method may include receiving control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The operations of 1505 may be performed in accordance with examples as disclosed herein. In some aspects, aspects of the operations of 1505 may be performed by a scheduled cell manager 925 as described with reference to FIG. 9.

At 1510, the method may include determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The operations of 1510 may be performed in accordance with examples as disclosed herein. In some aspects, aspects of the operations of 1510 may be performed by a DCI format manager 930 as described with reference to FIG. 9.

At 1515, the method may include receiving, via the downlink control channel monitoring occasion, DCI in accordance with the determined DCI format. The operations of 1515 may be performed in accordance with examples as disclosed herein. In some aspects, aspects of the operations of 1515 may be performed by a DCI manager 935 as described with reference to FIG. 9.

Figure 16:
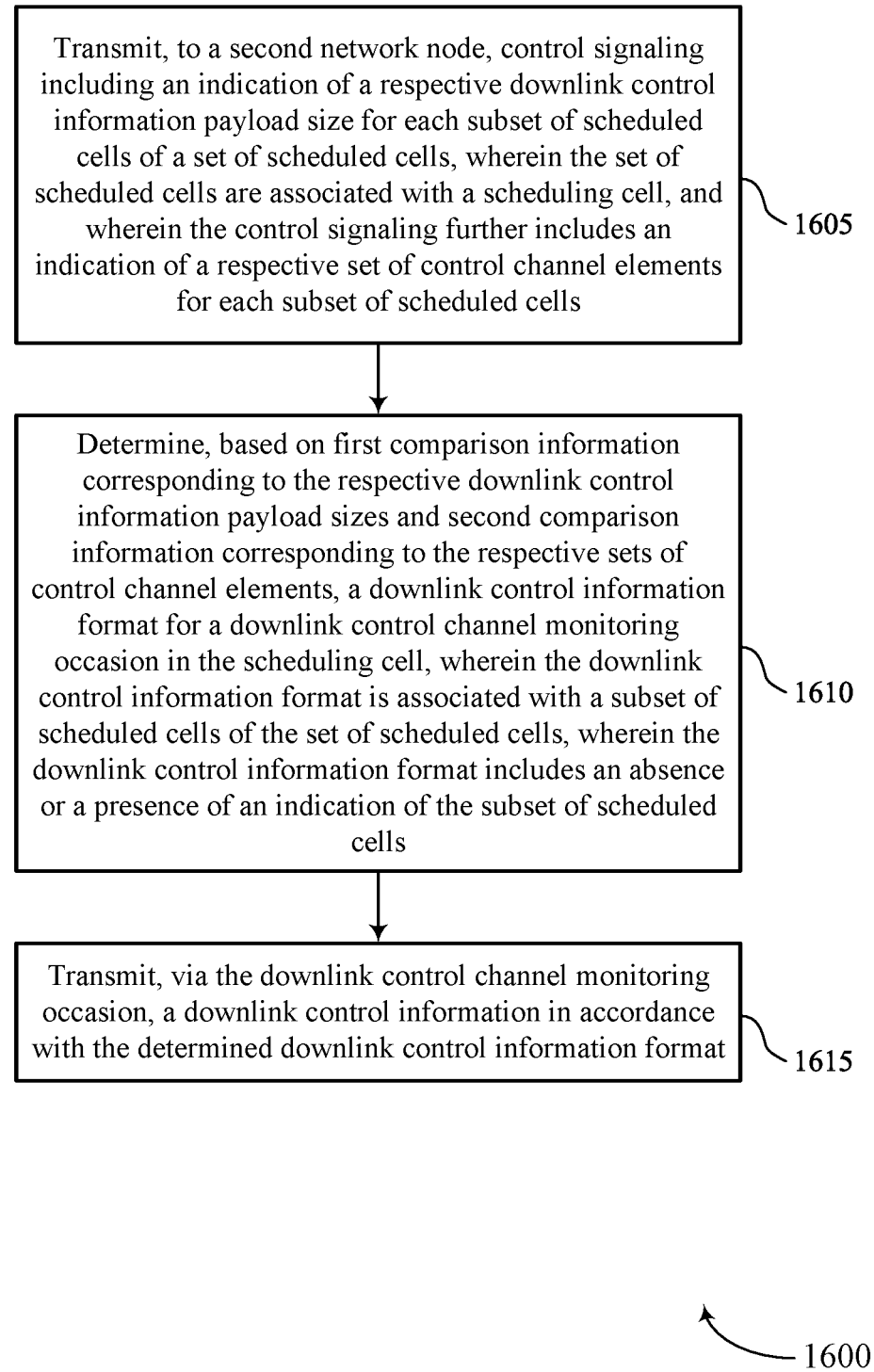

FIG. 16 shows a flowchart illustrating a method 1600 that supports scheduled cell identification for multi-cell scheduling in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some aspects, a network entity may execute a set of instructions to control the functional elements of the network entity to perform the described functions. Additionally, or alternatively, the network entity may perform aspects of the described functions using special-purpose hardware.

At 1605, the method may include transmitting, to a second network node, control signaling including an indication of a respective DCI payload size for each subset of scheduled cells of a set of scheduled cells, where the set of scheduled cells are associated with a scheduling cell, and where the control signaling further includes an indication of a respective set of CCEs for each subset of scheduled cells. The operations of 1605 may be performed in accordance with examples as disclosed herein. In some aspects, aspects of the operations of 1605 may be performed by a scheduled cell manager 1325 as described with reference to FIG. 13.

At 1610, the method may include determining, based on first comparison information corresponding to the respective DCI payload sizes and second comparison information corresponding to the respective sets of CCEs, a DCI format for a downlink control channel monitoring occasion in the scheduling cell, where the DCI format is associated with a subset of scheduled cells of the set of scheduled cells, where the DCI format includes an absence or a presence of an indication of the subset of scheduled cells. The operations of 1610 may be performed in accordance with examples as disclosed herein. In some aspects, aspects of the operations of 1610 may be performed by a DCI format manager 1330 as described with reference to FIG. 13.

At 1615, the method may include transmitting, via the downlink control channel monitoring occasion, a DCI in accordance with the determined DCI format. The operations of 1615 may be performed in accordance with examples as disclosed herein. In some aspects, aspects of the operations of 1615 may be performed by a DCI manager 1335 as described with reference to FIG. 13. The following provides an overview of aspects of the present disclosure:

Aspect 1: A method for wireless communications at a first network node, comprising: receiving control signaling including an indication of a respective DCI payload size for each subset of scheduled cells of a set of scheduled cells, wherein the set of scheduled cells are associated with a scheduling cell, and wherein the control signaling further includes an indication of a respective set of CCEs for each subset of scheduled cells; determining, based on first comparison information corresponding to the respective DCI payload sizes and second comparison information corresponding to the respective sets of CCEs, a DCI format for a downlink control channel monitoring occasion in the scheduling cell, wherein the DCI format is associated with a subset of scheduled cells of the set of scheduled cells, wherein the DCI format includes an absence or a presence of an indication of the subset of scheduled cells; and receiving, via the downlink control channel monitoring occasion, DCI in accordance with the determined DCI format.

Aspect 2: The method of aspect 1, wherein the control signaling further includes an indication of a respective set of downlink control channels for each subset of scheduled cells, wherein third comparison information corresponds to the respective sets of downlink control channels, and wherein determining the DCI format comprises: determining the DCI format based on the third comparison information.

Aspect 3: The method of any of aspects 1 through 2, wherein the first comparison information is indicative that each respective DCI payload size for each subset of scheduled cells is different, wherein determining the DCI format comprises: determining the DCI format based on a payload size for the downlink control channel monitoring occasion that matches a respective DCI payload size of the subset scheduled cells.

Aspect 4: The method of any of aspects 1 through 3, wherein the second comparison information is indicative that each respective set of CCEs for each subset of scheduled cells is different, and wherein determining the DCI format comprises: determining the DCI format based on a set of CCEs for the downlink control channel monitoring occasion that matches a respective set of CCEs for the subset of scheduled cells.

Aspect 5: The method of any of aspects 1 through 2, further comprising: determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, wherein the indication of the subset of scheduled cells comprises an explicit indication of the subset of scheduled cells.

Aspect 6: The method of any of aspects 1 through 2, further comprising: determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, wherein the indication of the subset of scheduled cells comprises a rule-based indication of the subset of scheduled cells.

Aspect 7: The method of aspect 6, wherein the rule-based indication comprises information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

Aspect 8: The method of any of aspects 1 through 2, further comprising: determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, wherein the indication of the subset of scheduled cells comprises a radio network identifier used to scramble a cyclic redundancy check of the downlink control channel monitoring occasion.

Aspect 9: The method of aspect 8, wherein the control signaling further includes an indication of an association between respective radio network identifiers and each subset of scheduled cells.

Aspect 10: The method of any of aspects 1 through 9, wherein DCI includes scheduling information for one or more communications with the subset of scheduled cells.

Aspect 11: The method of aspect 10, wherein the control signaling further includes an indication of a respective carrier indicator associated with each scheduled cell of the set of scheduled cells, and a determination of the scheduling information is based on the indication of the respective carrier indicator associated with each scheduled cell of the set of scheduled cells.

Aspect 12: The method of any of aspects 1 through 11, further comprising: comparing the respective DCI payload sizes; and generating the first comparison information based on the comparison of the respective DCI payload sizes.

Aspect 13: The method of any of aspects 1 through 12, further comprising: comparing the respective sets of CCEs; and generating the second comparison information based on the comparison of the respective sets of CCEs.

Aspect 14: A method for wireless communications at a first network node, comprising: transmitting, to a second network node, control signaling including an indication of a respective DCI payload size for each subset of scheduled cells of a set of scheduled cells, wherein the set of scheduled cells are associated with a scheduling cell, and wherein the control signaling further includes an indication of a respective set of CCEs for each subset of scheduled cells; determining, based on first comparison information corresponding to the respective DCI payload sizes and second comparison information corresponding to the respective sets of CCEs, a DCI format for a downlink control channel monitoring occasion in the scheduling cell, wherein the DCI format is associated with a subset of scheduled cells of the set of scheduled cells, wherein the downlink control channel format includes an absence or a presence of an indication of the subset of scheduled cells; and transmitting, via the downlink control channel monitoring occasion, a DCI in accordance with the determined DCI format.

Aspect 15: The method of aspect 14, wherein the control signaling further includes an indication of a respective set of downlink control channels for each subset of scheduled cells, wherein third comparison information corresponds to the respective sets of downlink control channels, and wherein determining the DCI format comprises: determining the DCI format based on the third comparison information.

Aspect 16: The method of any of aspects 14 through 15, wherein the first comparison information is indicative that each respective DCI payload size for each subset of scheduled cells is different, wherein determining the DCI format comprises: determining the DCI format based on a payload size for the downlink control channel monitoring occasion that matches a respective DCI payload size of the subset scheduled cells.

Aspect 17: The method of any of aspects 14 through 16, wherein the second comparison information is indicative that each respective set of CCEs for each subset of scheduled cells is different, and wherein determining the DCI format comprises: determining the DCI format based on a set of CCEs for the downlink control channel monitoring occasion that matches a respective set of CCEs for the subset of scheduled cells.

Aspect 18: The method of any of aspects 14 through 15, further comprising: determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, wherein the indication of the subset of scheduled cells comprises an explicit indication of the subset of scheduled cells.

Aspect 19: The method of any of aspects 14 through 15, further comprising: determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, wherein the indication of the subset of scheduled cells comprises a rule-based indication of the subset of scheduled cells.

Aspect 20: The method of aspect 19, wherein the rule-based indication comprises information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

Aspect 21: The method of any of aspects 14 through 15, further comprising: determining, based on the first comparison information being indicative that at least two respective DCI payload sizes for at least two subsets of scheduled cells are equal and further based on the second comparison information being indicative that respective sets of CCEs for the at least two subsets of scheduled cells are equal, that the DCI includes the presence of the indication of the subset of scheduled cells, wherein the indication of the subset of scheduled cells comprises a radio network identifier used to scramble a cyclic redundancy check of the downlink control channel monitoring occasion.

Aspect 22: The method of aspect 21, wherein the control signaling further includes an indication of an association between respective radio network identifiers and each subset of scheduled cells.

Aspect 23: The method of any of aspects 14 through 22, wherein DCI includes scheduling information for one or more communications with the subset of scheduled cells.

Aspect 24: The method of aspect 23, wherein the control signaling further includes an indication of a respective carrier indicator associated with each scheduled cell of the set of scheduled cells, and a determination of the scheduling information is based on the indication of the respective carrier indicator associated with each scheduled cell of the set of scheduled cells.

Aspect 25: The method of any of aspects 14 through 24, further comprising: comparing the respective DCI payload sizes; and generating the first comparison information based on the comparison of the respective DCI payload sizes.

Aspect 26: The method of any of aspects 14 through 25, further comprising: comparing the respective sets of CCEs; and generating the second comparison information based on the comparison of the respective sets of CCEs.

Aspect 27: A first network node for wireless communication, comprising: a memory; and at least one processor coupled to the memory, wherein the at least one processor is configured to: perform a method of any of aspects 1 through 13.

Aspect 28: An apparatus for wireless communications at a first network node, comprising at least one means for performing a method of any of aspects 1 through 13.

Aspect 29: A non-transitory computer-readable medium having code for wireless communication stored thereon that, when executed by a network node, causes the network node to perform a method of any of aspects 1 through 13.

Aspect 30: A first network node for wireless communication, comprising: a memory; and at least one processor coupled to the memory, wherein the at least one processor is configured to: perform a method of any of aspects 14 through 26.

Aspect 31: An apparatus for wireless communications at a first network node, comprising at least one means for performing a method of any of aspects 14 through 26.

Aspect 32: A non-transitory computer-readable medium having code for wireless communication stored thereon that, when executed by a network node, causes the network node to perform a method of any of aspects 14 through 26.

The methods described herein describe possible implementations, the operations and the steps may be rearranged or otherwise modified, and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
    a memory; and
    at least one processor coupled to the memory, wherein the at least one processor is configured to:
        receive control signaling including an indication of a respective downlink control information payload size for each subset of scheduled cells of a set of scheduled cells, wherein the set of scheduled cells are associated with a scheduling cell, and wherein the control signaling further includes an indication of a respective set of control channel elements for each subset of scheduled cells;
        determine, based on first comparison information corresponding to the respective downlink control information payload sizes and second comparison information corresponding to the respective sets of control channel elements, a downlink control information format for a downlink control channel monitoring occasion in the scheduling cell, wherein the downlink control information format is associated with a subset of scheduled cells of the set of scheduled cells, wherein the downlink control information format includes an absence or a presence of an indication of the subset of scheduled cells; and
        receive, via the downlink control channel monitoring occasion, downlink control information in accordance with the determined downlink control information format.

2. The first network node of claim 1, wherein the control signaling further includes an indication of a respective set of downlink control channels for each subset of scheduled cells, wherein third comparison information corresponds to the respective sets of downlink control channels, and wherein, to determine the downlink control information format, the at least one processor is configured to:
    determine the downlink control information format based on the third comparison information.

3. The first network node of claim 1, wherein the first comparison information is indicative that each respective downlink control information payload size for each subset of scheduled cells is different, wherein, to determine the downlink control information format, the at least one processor is configured to:
    determine the downlink control information format based on a payload size for the downlink control channel monitoring occasion that matches a respective downlink control information payload size of the subset of scheduled cells.

4. The first network node of claim 1, wherein the second comparison information is indicative that each respective set of control channel elements for each subset of scheduled cells is different, wherein, to determine the downlink control information format, the at least one processor is configured to:
    determine the downlink control information format based on a set of control channel elements for the downlink control channel monitoring occasion that matches a respective set of control channel elements for the subset of scheduled cells.

5. The first network node of claim 1, wherein the first comparison information is indicative that at least two respective downlink control information payload sizes for at least two subsets of scheduled cells are equal, wherein the second comparison information is indicative that respective sets of control channel elements for the at least two subsets of scheduled cells are equal, and wherein the at least one processor is configured to:
    determine, based on the first comparison information being indicative that the at least two respective downlink control information payload sizes are equal and the second comparison information being indicative that the respective sets of control channel elements are equal, that the downlink control information includes the presence of the indication of the subset of scheduled cells, wherein the indication of the subset of scheduled cells comprises an explicit indication of the subset of scheduled cells.

6. The first network node of claim 1, wherein the first comparison information is indicative that at least two respective downlink control information payload sizes for at least two subsets of scheduled cells are equal, wherein the second comparison information is indicative that respective sets of control channel elements for the at least two subsets of scheduled cells are equal, and wherein the at least one processor is configured to:
    determine, based on the first comparison information being indicative that the at least two respective downlink control information payload sizes are equal and the second comparison information being indicative that the respective sets of control channel elements are equal, that the downlink control information includes the presence of the indication of the subset of scheduled cells, wherein the indication of the subset of scheduled cells comprises a rule-based indication of the subset of scheduled cells.

7. The first network node of claim 6, wherein the rule-based indication comprises information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

8. The first network node of claim 1, wherein the first comparison information is indicative that at least two respective downlink control information payload sizes for at least two subsets of scheduled cells are equal, wherein the second comparison information is indicative that respective sets of control channel elements for the at least two subsets of scheduled cells are equal, and wherein the at least one processor is configured to:
 determine, based on the first comparison information being indicative that the at least two respective downlink control information payload sizes are equal and the second comparison information being indicative that the respective sets of control channel elements are equal, that the downlink control information includes the presence of the indication of the subset of scheduled cells, wherein the indication of the subset of scheduled cells comprises a radio network identifier used to scramble a cyclic redundancy check of the downlink control channel monitoring occasion.

9. The first network node of claim 8, wherein the control signaling further includes an indication of an association between respective radio network identifiers and each subset of scheduled cells.

10. The first network node of claim 1, wherein the downlink control information includes scheduling information for one or more communications with the subset of scheduled cells.

11. The first network node of claim 10, wherein the control signaling further includes an indication of a respective carrier indicator associated with each scheduled cell of the set of scheduled cells, and wherein a determination of the scheduling information is based on the indication of the respective carrier indicator associated with each scheduled cell of the set of scheduled cells.

12. The first network node of claim 1, wherein the at least one processor is configured to:
 compare the respective downlink control information payload sizes; and
 generate the first comparison information based on the comparison of the respective downlink control information payload sizes.

13. The first network node of claim 1, wherein the at least one processor is configured to:
 compare the respective sets of control channel elements; and
 generate the second comparison information based on the comparison of the respective sets of control channel elements.

14. A first network node for wireless communication, comprising:
 a memory; and
 at least one processor coupled to the memory, wherein the at least one processor is configured to:
  transmit, to a second network node, control signaling including an indication of a respective downlink control information payload size for each subset of scheduled cells of a set of scheduled cells, wherein the set of scheduled cells are associated with a scheduling cell, and wherein the control signaling further includes an indication of a respective set of control channel elements for each subset of scheduled cells;
  determine, based on first comparison information corresponding to the respective downlink control information payload sizes and second comparison information corresponding to the respective sets of control channel elements, a downlink control information format for a downlink control channel monitoring occasion in the scheduling cell, wherein the downlink control information format is associated with a subset of scheduled cells of the set of scheduled cells, wherein the downlink control information format includes an absence or a presence of an indication of the subset of scheduled cells; and
  transmit, via the downlink control channel monitoring occasion, a downlink control information in accordance with the determined downlink control information format.

15. The first network node of claim 14, wherein the control signaling further includes an indication of a respective set of downlink control channels for each subset of scheduled cells, wherein third comparison information corresponds to the respective sets of downlink control channels, and wherein, to determine the downlink control information format, the at least one processor is configured to:
 determine the downlink control information format based on the third comparison information.

16. The first network node of claim 14, wherein the first comparison information is indicative that each respective downlink control information payload size for each subset of scheduled cells is different, wherein to determine the downlink control information format, the at least one processor is configured to:
 determine the downlink control information format based on a payload size for the downlink control channel monitoring occasion that matches a respective downlink control information payload size of the subset of scheduled cells.

17. The first network node of claim 14, wherein the second comparison information is indicative that each respective set of control channel elements for each subset of scheduled cells is different, wherein to determine the downlink control information format, the at least one processor is configured to:
 determine is based on a set of control channel elements for the downlink control channel monitoring occasion that matches a respective set of control channel elements for the subset of scheduled cells.

18. The first network node of claim 14, wherein the first comparison information is indicative that at least two respective downlink control information payload sizes for at least two subsets of scheduled cells are equal, wherein the second comparison information is indicative that respective sets of control channel elements for the at least two subsets of scheduled cells are equal, and wherein the at least one processor is configured to:
 determine, based on the first comparison information being indicative that the at least two respective downlink control information payload sizes are equal and the second comparison information being indicative that the respective sets of control channel elements are equal, that the downlink control information includes the presence of the indication of the subset of scheduled cells, wherein the indication of the subset of scheduled cells comprises an explicit indication of the subset of scheduled cells.

19. The first network node of claim 14, wherein the first comparison information is indicative that at least two respective downlink control information payload sizes for at least two subsets of scheduled cells are equal, wherein the second comparison information is indicative that respective sets of control channel elements for the at least two subsets of scheduled cells are equal, and wherein the at least one processor is configured to:
  determine, based on the first comparison information being indicative that the at least two respective downlink control information payload sizes are equal and the second comparison information being indicative that the respective sets of control channel elements are equal, that the downlink control information includes the presence of the indication of the subset of scheduled cells, wherein the indication of the subset of scheduled cells comprises a rule-based indication of the subset of scheduled cells.

20. The first network node of claim 19, wherein the rule-based indication comprises information indicative of a rule to select the subset of scheduled cells of the set of scheduled cells based on one of a component carrier index associated with one or more scheduled cells within the subset of scheduled cells, a subcarrier spacing associated with one or more scheduled cells within the subset of scheduled cells, the subset of scheduled cells including a primary cell for the first network node, the subset of scheduled cells including the scheduling cell, or a number of cells associated with the subset of scheduled cells.

21. The first network node of claim 14, wherein the first comparison information is indicative that at least two respective downlink control information payload sizes for at least two subsets of scheduled cells are equal, wherein the second comparison information is indicative that respective sets of control channel elements for the at least two subsets of scheduled cells are equal, and wherein the at least one processor is configured to:
  determine, based on the first comparison information being indicative that the at least two respective downlink control information payload sizes are equal and the second comparison information being indicative that the respective sets of control channel elements are equal, that the downlink control information includes the presence of the indication of the subset of scheduled cells, wherein the indication of the subset of scheduled cells comprises a radio network identifier used to scramble a cyclic redundancy check of the downlink control channel monitoring occasion.

22. The first network node of claim 21, wherein the control signaling further includes an indication of an association between respective radio network identifiers and each subset of scheduled cells.

23. The first network node of claim 14, wherein the downlink control information includes scheduling information for one or more communications between the second network node and the subset of scheduled cells.

24. The first network node of claim 23, wherein the control signaling further includes an indication of a respective carrier indicator associated with each scheduled cell of the set of scheduled cells, and wherein a determination of the scheduling information is based on the indication of the respective carrier indicator associated with each scheduled cell of the set of scheduled cells.

25. The first network node of claim 14, wherein the at least one processor is configured to:
  compare the respective downlink control information payload sizes; and
  generate the first comparison information based on the comparison of the respective downlink control information payload sizes.

26. The first network node of claim 14, wherein the at least one processor is configured to:
  compare the respective sets of control channel elements; and
  generate the second comparison information based on the comparison of the respective sets of control channel elements.

27. A method for wireless communications at a first network node, comprising:
  receiving control signaling including an indication of a respective downlink control information payload size for each subset of scheduled cells of a set of scheduled cells, wherein the set of scheduled cells are associated with a scheduling cell, and wherein the control signaling further includes an indication of a respective set of control channel elements for each subset of scheduled cells;
  determining, based on first comparison information corresponding to the respective downlink control information payload sizes and second comparison information corresponding to the respective sets of control channel elements, a downlink control information format for a downlink control channel monitoring occasion in the scheduling cell, wherein the downlink control information format is associated with a subset of scheduled cells of the set of scheduled cells, wherein the downlink control information format includes an absence or a presence of an indication of the subset of scheduled cells; and
  receiving, via the downlink control channel monitoring occasion, downlink control information in accordance with the determined downlink control information format.

28. The method of claim 27, wherein the control signaling further includes an indication of a respective set of downlink control channels for each subset of scheduled cells, wherein third comparison information corresponds to the respective sets of downlink control channels, and wherein determining the downlink control information format comprises:
  determining the downlink control information format based on the third comparison information.

29. The method of claim 27, wherein the first comparison information is indicative that each respective downlink control information payload size for each subset of scheduled cells is different, wherein determining the downlink control information format comprises:
  determining the downlink control information format based on a payload size for the downlink control channel monitoring occasion that matches a respective downlink control information payload size of the subset of scheduled cells.

30. A method for wireless communications at a first network node, comprising:
  transmitting, to a second network node, control signaling including an indication of a respective downlink control information payload size for each subset of scheduled cells of a set of scheduled cells, wherein the set of scheduled cells are associated with a scheduling cell, and wherein the control signaling further includes an indication of a respective set of control channel elements for each subset of scheduled cells;
  determining, based on first comparison information corresponding to the respective downlink control information payload sizes and second comparison information corresponding to the respective sets of control channel elements, a downlink control information format for a downlink control channel monitoring occasion in the scheduling cell, wherein the downlink control information format is associated with a subset of scheduled cells of the set of scheduled cells, wherein the downlink control information format includes an absence or a presence of an indication of the subset of scheduled cells; and transmitting, via the downlink control channel monitoring occasion, a downlink control information in accordance with the determined downlink control information format.

* * * * *